US012570884B2

(12) United States Patent     (10) Patent No.:   US 12,570,884 B2
Blicharski et al.     (45) Date of Patent:    Mar. 10, 2026

(54) BONDED ABRASIVE AND METHODS OF FORMING SAME

(71) Applicants: SAINT-GOBAIN ABRASIVES, INC., Worcester, MA (US); SAINT-GOBAIN SURFACE SOLUTIONS FRANCE, Conflans-Sainte-Honorine (FR)

(72) Inventors: Marcin P. Blicharski, Orly (PL); Dominik Jamiola, Lowicz (PL); Tyler Cichowlas, Sudbury, MA (US)

(73) Assignees: SAINT-GOBAIN ABRASIVES, INC., Worcester, MA (US); SAINT-GOBAIN SURFACE SOLUTIONS FRANCE, Conflans-Sainte-Honorine (FR)

( * ) Notice: Subject to any disclaimer, the term of this patent is extended or adjusted under 35 U.S.C. 154(b) by 621 days.

(21) Appl. No.: 17/757,656

(22) PCT Filed: Dec. 18, 2020

(86) PCT No.: PCT/US2020/065998
§ 371 (c)(1),
(2) Date: Jun. 17, 2022

(87) PCT Pub. No.: WO2021/127425
PCT Pub. Date: Jun. 24, 2021

(65) Prior Publication Data
US 2023/0025183 A1     Jan. 26, 2023

Related U.S. Application Data

(60) Provisional application No. 62/952,200, filed on Dec. 20, 2019.

(51) Int. Cl.
*C09K 3/14*     (2006.01)
*B24D 3/02*     (2006.01)

(52) U.S. Cl.
CPC .............. *C09K 3/1409* (2013.01); *B24D 3/02* (2013.01); *C09K 3/1436* (2013.01)

(58) Field of Classification Search
CPC ...... C09K 3/1409; C09K 3/1436; B24D 3/02; B24D 18/0009; B24D 3/34
See application file for complete search history.

(56) References Cited

U.S. PATENT DOCUMENTS

| | | | |
|---|---|---|---|
| 4,840,746 A | 6/1989 | Shiozaki et al. | |
| 5,131,923 A | 7/1992 | Markhoff-Matheny et al. | |

(Continued)

FOREIGN PATENT DOCUMENTS

| | | |
|---|---|---|
| BR | PI0920458 A2 | 12/2015 |
| CA | 2402279 A1 | 9/2001 |

(Continued)

OTHER PUBLICATIONS

Kjeldsen et al. (Mixed alkaline earth effect in sodium aluminosilicate glasses, Journal of Non-Crystalline Solids, 369, pp. 61-68) (Year: 2013).*

(Continued)

*Primary Examiner* — Amber R Orlando
*Assistant Examiner* — Anastasia A. Kuvayskaya
(74) *Attorney, Agent, or Firm* — Abel Schillinger, LLP; Arpan Ghosh

(57) ABSTRACT

An abrasive article including a bonded abrasive body having abrasive particles contained within a bond material, and at least a portion of the abrasive particles comprise a multi-phase aluminosilicate.

22 Claims, 7 Drawing Sheets

(56)                    References Cited

U.S. PATENT DOCUMENTS

| | | | |
|---|---|---|---|
| 5,472,461 | A | 12/1995 | Li |
| 5,690,705 | A | 11/1997 | Holmes et al. |
| 5,851,247 | A | 12/1998 | Stoetzel et al. |
| 5,928,070 | A | 7/1999 | Lux |
| 8,206,473 | B2 | 6/2012 | Huzinec et al. |
| 9,102,858 | B2 | 8/2015 | Gebhardt |
| 9,144,885 | B2 | 9/2015 | Sarangi et al. |
| 9,816,020 | B2 | 11/2017 | Alary et al. |
| 10,323,165 | B2 | 6/2019 | Gebhardt et al. |
| 2004/0221515 | A1* | 11/2004 | McArdle ............... C04B 35/622 |
| | | | 51/308 |
| 2009/0235591 | A1 | 9/2009 | Yener et al. |
| 2013/0000215 | A1 | 1/2013 | Wang et al. |
| 2017/0152193 | A1 | 6/2017 | Desiles et al. |
| 2018/0085896 | A1 | 3/2018 | Paramban et al. |

FOREIGN PATENT DOCUMENTS

| | | | | |
|---|---|---|---|---|
| CN | 103442851 | A | 12/2013 | |
| CN | 104066808 | A | 9/2014 | |
| CN | 104531068 | A | 4/2015 | |
| CN | 105215864 | A | 1/2016 | |
| CN | 107530865 | A | 1/2018 | |
| CN | 109321204 | A | 2/2019 | |
| GB | 893677 | A | 4/1962 | |
| GB | 2329133 | A | 3/1999 | |
| JP | 2002220584 | A | 8/2002 | |
| WO | 9700836 | A1 | 1/1997 | |
| WO | 2001056945 | A1 | 8/2001 | |
| WO | WO-2018081246 | A1 * | 5/2018 | ........... B24D 11/001 |
| WO | 2019069157 | A1 | 4/2019 | |
| WO | 2019167022 | A1 | 9/2019 | |

OTHER PUBLICATIONS

Shackelford et al. Ceramics and glass materials, Structure, properties and processing, Springer, 2008 (Year: 2008).*

Hansen, Tony, "Molochite", Materials for Ceramics, DigitalFire. com Reference Library, Accessed Jul. 6, 2023, 5 pages <https://digitalfire.com/material/1034>.

International Search Report for PCT/US2020/065998 mailed Apr. 6, 2021, 1 pg.

* cited by examiner

BONDED ABRASIVE AND METHODS OF FORMING SAME

CROSS-REFERENCE TO RELATED APPLICATIONS

This application is a National Stage entry under 35 U.S.C. § 371 of International Application No. PCT/US2020/065998, filed Dec. 18, 2020, entitled "BONDED ABRASIVE AND METHODS OF FORMING SAME," by Marcin P. BLICHARSKI et al., which claims priority to U.S. Provisional Patent Application No. 62/952,200, filed Dec. 20, 2019, entitled "BONDED ABRASIVE AND METHODS OF FORMING SAME," by Marcin P. BLICHARSKI et al., all of which applications are assigned to the current assignees hereof and incorporated herein by reference in their entireties.

TECHNICAL FIELD

This disclosure is related to abrasive articles, and particularly, to bonded abrasive articles including abrasive particles including multiphase aluminosilicate.

Abrasive articles are used in various industries to machine work pieces by cutting, lapping, grinding or polishing. Abrasives used in machining applications typically include bonded abrasive articles and coated abrasive articles. Coated abrasive articles are generally layered articles having a backing and an adhesive coat to fix abrasive particles to the backing, the most common example of which is sandpaper. Bonded abrasive tools consist of rigid, and typically monolithic, three-dimensional, abrasive composites in various shapes.

The industry continues to demand improved methods and articles capable of grinding.

SUMMARY

In one aspect, an abrasive article includes a bonded abrasive body including abrasive particles contained within a bond material, wherein at least a portion of the abrasive particles comprise multiphase aluminosilicate.

In another aspect, a method for conducting a material removal process includes moving a bonded abrasive body relative to a workpiece comprising a non-ferrous metal material, wherein the bonded abrasive body includes abrasive particles contained within a bond material, wherein at least a portion of the abrasive particles comprise multiphase aluminosilicate.

BRIEF DESCRIPTION OF THE DRAWINGS

The present disclosure may be better understood, and its numerous features and advantages made apparent to those skilled in the art by referencing the accompanying drawings.

Figure 1:
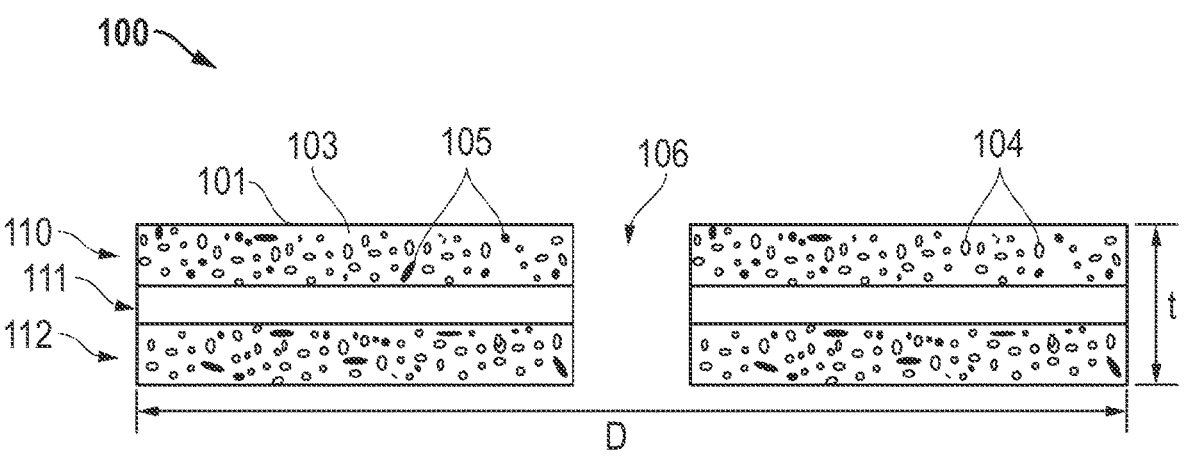
FIG. 1 includes a cross-sectional illustration of an abrasive article according to an embodiment.

The use of the same reference symbols in different drawings indicates similar or identical items. Embodiments are illustrated by way of example and are not limited in the accompanying figures. Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE PREFERRED EMBODIMENT(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts. The following is a dictation for 1803 nine.

The following is directed toward bonded abrasive articles. The bonded abrasive articles can include abrasive bodies having a three-dimensional matrix of bond material. The bonded abrasive bodies can have any desired shape, which is likely dependent upon the intended use of the abrasive article. The bonded abrasive body may be in the form of wheels, discs, segments, mounted points, hones and other tool shapes, which can be mounted onto a machining apparatus, such as a grinding or polishing apparatus. The abrasive articles of the embodiments herein may be particularly useful in grinding and shaping certain types of workpieces, including for example, metals, metal alloys, and particularly non-ferrous metal materials.

The abrasive article may be formed by first forming a mixture and shaping the mixture into a green body. The green body may be subject to one or more processes to convert the green body to the finally-formed abrasive article. In some instances, the forming process may form the finally-formed abrasive article directly from the mixture, without need for forming a free-standing green body. The process of forming a green body can include mixing the desired components in mixture. Exemplary components can include a bond material or bond precursor material (i.e., material that may physically and/or chemically transform during processing to form the final bond material in the bonded abrasive body), abrasive particles, fillers, reinforcing members, rheology modifiers, subtractive agents (e.g., pore formers) and the like. Suitable methods for forming the green body and the finally-formed abrasive article may include mixing, depositing, punching, stamping, printing, molding, casting, pressing (e.g., isostatic pressing), heating, cooling, drying, volatilizing, firing, sintering, or any combination thereof.

FIG. 1 includes a cross-sectional view of a portion of an abrasive article in accordance with an embodiment. As illustrated in FIG. 1, the abrasive article 100 can have a body 101. The body 101 may include a bond material 103 that extends throughout the volume of the body 101 as a three-dimensional matrix. The body 101 may have exterior surfaces primarily defined by the bond material 103. The bonded abrasive body 101 can further include abrasive particles 104 contained within the bond material 103. The abrasive particles 104 may be substantially enveloped by and distributed uniformly throughout the three-dimensional network of the bond material 103. Furthermore, the body 101 may include porosity 105 that is contained within the body 101. The porosity can be open or closed porosity and may have a variety of shapes. Furthermore, as illustrated in FIG. 1, the body 101 may include an opening 106, which may be an aperture extending through the entire thickness (t) of the body 101. The opening 106 may have dimensions suitable for mounting the body 101 on a system configured to actuate the body 101 for a material removal process.

As further illustrated in FIG. 1, the body 101 may include a first abrasive layer 110, a second abrasive layer 112, and a reinforcing layer 111 disposed between the first abrasive layer 110 and second abrasive layer 112. It will be appreciated that such elements such as the first abrasive layer 110, second abrasive layer 112 and reinforcing layer 111 are optional depending upon the design and structure of the abrasive article 100. It is understood that in certain embodiments, the body 101 may include a single monolithic body of bond material and abrasive particles, and may not include any reinforcing members. Furthermore, it will be appreciated that a variety of arrangements of abrasive layers and/or one or more reinforcing members may be utilized depending upon the intended application of the bonded abrasive body.

In one particular aspect, the abrasive particles 104 may include multiphase aluminosilicate. For example, in one embodiment the bonded abrasive body 101 may include a particular content of multiphase aluminosilicate in the abrasive particles, which may facilitate improved performance of the bonded abrasive body 101. For example, in one embodiment, at least 10 vol % of the abrasive particles 104 comprise multiphase aluminosilicate for a total volume of the abrasive particles, such as at least 20 vol % or at least 30 vol % or at least 40 vol % or at least 50 vol % or at least 60 vol % or at least 70 vol % or at least 80 vol % or at least 90 vol % or at least 95 vol %. Still, in another non-limiting embodiment, not greater than 99 vol % of the abrasive particles may include multiphase aluminosilicate, such as not greater than 95 vol % or not greater than 90 vol % or not greater than 80 vol % or not greater than 70 vol % or not greater than 60 vol % or not greater than 50 vol % or not greater than 40 vol % or not greater than 30 vol % or not greater than 20 vol % or not greater than 10 vol %. It will be appreciated that the content of multiphase aluminosilicate in the abrasive particles may be within a range including any of the minimum and maximum percentages noted above. And still, in another embodiment, essentially all of the abrasive particles comprise multiphase aluminosilicate, and more specifically, all of the abrasive particles may consist essentially of multiphase aluminosilicate.

The multiphase aluminosilicate can be formed by calcining kaolin, and particularly, low iron content kaolin. Multiphase aluminosilicate can have a polycrystalline phase and an amorphous phase. The polycrystalline phase can be an aluminosilicate material, such as mullite. The amorphous phase generally includes or consists of silica. The content of the polycrystalline phase and amorphous phase may vary depending upon the composition of the kaolin raw material and the processing of the kaolin. Multiphase aluminosilicate is generally used as a grog material in porcelain due to its propensity to fire with a desirable white color. It is also used as a coating material in the investment casting industry. An exemplary multiphase aluminosilicate is Molochite™. In one embodiment, the multiphase aluminosilicate may have more than two phases. Still, in another embodiment, the multiphase aluminosilicate may consist only of two phases, a polycrystalline aluminosilicate phase and an amorphous silica phase.

In another embodiment, the abrasive particles 104 may include a blend, including a first group of abrasive particles comprising multiphase aluminosilicate and a second group of abrasive particles comprising at least one material from the group of oxides, carbides, nitrides, borides, diamond, or any combination thereof. For example, in one particular body, the second group of abrasive particles may include silicon carbide, alumina, or a combination thereof. Furthermore, in another embodiment, the second group abrasive particles may include agglomerated particles. Still, in other embodiments, the second group of abrasive particles may include unagglomerated particles.

For at least one aspect, the portion of abrasive particles including multiphase aluminosilicate may be agglomerates comprising multiphase aluminosilicate, such as agglomerates consisting essentially of multiphase aluminosilicate. Still, in another embodiment, the portion of abrasive particles including multiphase aluminosilicate may include unagglomerated particles comprising multiphase aluminosilicate, and more specifically, unagglomerated particles consisting essentially of multiphase aluminosilicate.

The blend may include particular contents of the first group of abrasive particles and the second group of abrasive particles that may facilitate improved performance of the abrasive article. For example, the blend may include at least 10 vol % of the second group of abrasive particles, such as at least 20 vol % or at least 30 vol % or at least 40 vol % or at least 50 vol % or at least 60 vol % or at least 70 vol % or at least 80 vol % or at least 90 vol % or at least 95 vol %. Still, in another non-limiting embodiment, the blend may include not greater than 99 vol % of the second group of abrasive particles, such as not greater than 95 vol % or not greater than 90 vol % or not greater than 80 vol % or not greater than 70 vol % or not greater than 60 vol % or not greater than 50 vol % or not greater than 40 vol % or not greater than 30 vol % or not greater than 20 vol % or not greater than 10 vol %. It will be appreciated that the blend may include a content of the second group of abrasive particles within a range including any of the minimum and maximum percentages noted above. It will also be appreciated that the blend may include more than the two groups of abrasive particles and any number of different groups of abrasive particles may be used to create a suitable blend.

In another aspect, the abrasive particles can have a particular composition and microstructure that may facilitate improved performance. As noted herein, the multiphase aluminosilicate can include two phases, such as a first phase comprising a polycrystalline material and a second phase comprising an amorphous material. The multiphase aluminosilicate may include a certain content of the first phase. For example, the multiphase aluminosilicate may include at least 5 mass % of the first phase for a total mass of the multiphase aluminosilicate such as, such as at least 10 mass % or at least 20 mass % or at least 30 mass % or at least 40 mass % or at least 50 mass % or at least 55 mass % or at least 60 mass % or at least 70 mass % or at least 80 mass % or at least 90 mass % or at least 95 mass %. Still, in another non-limiting embodiment, the multiphase aluminosilicate may include not greater than 99 mass % of the first phase for a total mass of the multiphase aluminosilicate, such as not greater than 98 mass % or not greater than 96 mass % or not greater than 94 mass % or not greater than 90 mass % or not greater than 80 mass % or not greater than 70 mass % or not greater than 60 mass % or not greater than 55 mass % or not greater than 50 mass % or not greater than 40 mass % or not greater than 30 mass % or not greater than 20 mass % or not greater than 10 mass %. It will be appreciated that the mass % of the first phase in the multiphase aluminosilicate may be within range including any of the minimum and maximum percentages noted above. Without wishing to be tied to a particular theory, it is thought that the control of the ratio of the polycrystalline phase to the amorphous phase may facilitate suitable fracturing mechanics when using the material as an abrasive particle.

In yet another embodiment, the multiphase aluminosilicate may include at least 5 mass % of the second phase for a total mass of the multiphase aluminosilicate, such as 10 mass % or at least 20 mass % or at least 30 mass % or at least 40 mass % or at least 45 mass % or at least 50 mass % or at least 60 mass % or at least 70 mass % or at least 80 mass % or at least 90 mass %. Still, in another embodiment, the multiphase aluminosilicate may include not greater than 90 mass % of the second phase for a total mass of the multiphase aluminosilicate, such as not greater than 80 mass % or not greater than 70 mass % or not greater than 60 mass % or not greater than 50 mass % or not greater than 45 mass % or not greater than 40 mass % or not greater than 30 mass % or not greater than 20 mass % or not greater than 15 mass % or not greater than 10 mass % or not greater than 5 mass %. It will be appreciated that the mass % of the second phase in the multiphase aluminosilicate may be within range including any of the minimum and maximum percentages noted above.

In some instances, the multiphase aluminosilicate morphology may include a certain content of the first phase relative to the second phase. For example, the multiphase aluminosilicate may have a content ratio (Cr=C1/C2) of at least 0.1, wherein C1 is the mass percent of the first phase in the multiphase aluminosilicate and C2 is the mass percent of the second phase in the multiphase aluminosilicate. For example, the content ratio may be at least 0.2, such as at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5. Still, in another non-limiting embodiment, the content ratio may be not greater than 4, such as not greater than 3.5 or not greater than 3 or not greater than 2.5 or not greater than 2 or not greater than 1.9 or not greater than 1.8 or not greater than 1.7 or not greater than 1.6 or not greater than 1.5 or not greater than 1.4 or not greater than 1.3 or not greater than 1.2 or not greater than 1.1 or not greater than 1 or not greater than 0.9 or not greater than 0.8 or not greater than 0.7 or not greater than 0.6 or not greater than 0.5 or not greater than 0.4 or not greater than 0.3 or not greater than 0.2. It will be appreciated that the content ratio can be within a range including any of the minimum and maximum values noted above.

In certain instances, the first phase may include an aluminosilicate material, and more particularly, may consist essentially of an aluminosilicate material. In still other instances, the first phase may include a polycrystalline aluminosilicate material, wherein the polycrystalline material has a particular average crystallite size (D50) as measured according to the intercept method. For example, the first phase may have an average crystallite size within range of at least 1 nm to not greater than 1000 microns.

The multiphase aluminosilicate may have a certain composition that may facilitate improved performance as an abrasive particle. For example, the multiphase aluminosilicate may include at least 10 mass % of alumina ($Al_2O_3$) for a total mass of multiphase aluminosilicate, such as at least 20 mass % or at least 30 mass % or at least 40 mass % or at least 42 mass % or at least 44 mass % or at least 46 mass % or at least 48 mass %. Still, in another non-limiting embodiment, the content of alumina in the multiphase aluminosilicate may be not greater than 65 mass % for total mass of the multiphase aluminosilicate, such as not greater than 60 mass % or not greater than 55 mass % or not greater than 50 mass % or not greater than 48 mass % or not greater than 45 mass % or not greater than 42 mass % or not greater than 40 mass %. It will be appreciated that the mass % of alumina in the multiphase aluminosilicate may be within range including any of the minimum and maximum percentages noted above.

In another embodiment, the multiphase aluminosilicate may include particular content of silica ($SiO_2$), such as at least 10 mass % for a total mass of multiphase aluminosilicate, such as at least 20 mass % or at least 25 mass % or at least 30 mass % or at least 40 mass % or at least 45 mass % or at least 50 mass % or at least 52 mass % or at least 54 mass % or at least 56 mass % or at least 58 mass % or at least 60 mass %. In another non-limiting embodiment, the mass % of silica in the multiphase aluminosilicate may be not greater than 80 mass % for a total mass of the multiphase aluminosilicate, such as not greater than 70 mass % or not greater than 60 mass % or not greater than 58 mass % or not greater than 56 mass % or not greater than 54 mass % or not greater than 52 mass % or not greater than 50 mass %. It will be appreciated that the mass content of silica in the multiphase aluminosilicate may be within range including any of the minimum and maximum percentages noted above.

In a further embodiment, the multiphase aluminosilicate may include less than 1 mass % of crystalline silica. In a particular aspect, the multiphase aluminosilicate may be essentially free of crystalline silica. In another particular embodiment, the multiphase aluminosilicate may be free of a quartz, cristobalite, and nodular iron.

In other instances, the multiphase aluminosilicate may include a particular content of potassium oxide. For example, in one embodiment the Multiphase aluminosilicate may include at least 0.5 mass % potassium oxide ($K_2O$) for a total mass of the multiphase aluminosilicate, such as at least 0.8 mass % or at least 1 mass % or at least 1.2 mass % or at least 1.5 mass % or at least 1.8 mass % or at least 2 mass % or at least 2.5 mass %. Still, in another non-limiting embodiment, the multiphase aluminosilicate may include not greater than 8 mass % potassium oxide for total mass of multiphase aluminosilicate, such as not greater than 5 mass % or not greater than 4 mass % or not greater than 3 mass % or not greater than 2.5 mass %. It will be appreciated that the content of potassium oxide in the multiphase aluminosilicate may be within range including any of the minimum and maximum percentages noted above.

In another embodiment, the multiphase aluminosilicate may include certain content of iron oxide ($Fe_2O_3$ or $Fe_3O_4$) that may facilitate improved performance as an abrasive particle. For example, the multiphase aluminosilicate may include at least 0.5 mass % iron oxide for total mass of the multiphase aluminosilicate, such as at least 1 mass % or at least 1.2 mass % or at least 1.5 mass % or at least 1.8 mass % or at least 2 mass %. Still, in another non-limiting embodiment, multiphase aluminosilicate may include not greater than 8 mass % iron oxide for total mass of multiphase aluminosilicate, such as not greater than 5 mass % or not greater than 4 mass % or not greater than 3 mass % or not greater than 2.5 mass % or not greater than 2 mass % or not greater than 1.8 mass % or not greater than 1.5 mass %. It will be appreciated that the content of iron oxide in the multiphase aluminosilicate may be within range including any of the minimum and maximum percentages noted above.

Multiphase aluminosilicate may also include certain contents of titanium oxide ($TiO_2$), calcium oxide (CaO), and magnesium oxide (MgO), which may facilitate improved performance as an abrasive particle. For example, the multiphase aluminosilicate may include at least 0.1 mass % of a total content of titanium oxide, calcium oxide, and magnesium oxide for total mass of the multiphase aluminosilicate, such as at least 0.2 mass % or at least 0.3 mass % or at least 0.4 mass % or at least 0.5 mass % or at least 0.6 mass %. In other embodiments, the multiphase aluminosilicate may include not greater than 2 mass % of a total content of titanium oxide, calcium oxide, and magnesium oxide for total mass of the multiphase aluminosilicate, such as not greater than 1 mass % or not greater than 0.8 mass % or not greater than 0.6 mass %. It will be appreciated that the total mass content of titanium oxide, calcium oxide, magnesium oxide in the multiphase aluminosilicate may be within range including any of the minimum and maximum percentages noted above.

In a further embodiment, multiphase aluminosilicate may be essentially free of zirconia ($ZrO_2$).

The multiphase aluminosilicate may have a particular Mohs hardness, which may facilitate use as an abrasive particle. For example, the multiphase aluminosilicate may have a Mohs hardness of at least 6, such as at least 7, at least 8, or even 9. Still, in one embodiment, the Mohs hardness of the multiphase aluminosilicate may be not greater than 9, such as not greater than 8. It will be appreciated that the Mohs hardness of multiphase aluminosilicate may be within range including any of the minimum and maximum values noted above, including for example within range of at least 6 and not greater than 9.

The multiphase aluminosilicate may have a particular average Vickers hardness, which may facilitate use as an abrasive particle. For example, the multiphase aluminosilicate may have average Vickers hardness of at least 6.5 GPa, such as at least 6.7 GPa or at least 6.8 GPa or at least 7 GPa or at least 7.3 GPa or at least 7.5 GPa or at least 7.7 GPa or at least 7.9 GPa or at least 8 GPa. In another example, the multiphase aluminosilicate may have average Vickers hardness of not greater than 12 GPa, such as not greater than 11 GPa or not greater than 10 GPa or not greater than 9.7 GPa or not greater than 9.5 GPa or not greater than 9.3 GPa or not greater than 9.1 GPA or not greater than 9 GPa or not greater than 8.7 GPa or not greater than 8.5 GPa or not greater than 8.3 GPa or not greater than 8.2 GPa. It will be appreciated that the average Vickers hardness of multiphase aluminosilicate may be within range including any of the minimum and maximum values noted above, including for example within range of at least 6.5 GPa and not greater than 12 GPa.

It will be appreciated that Vickers hardness is measured based on a diamond indentation method (well known in the art and standardized) of a polished surface of the abrasive grain. Samples of abrasive grains are prepared by making a bakelite mount in epoxy resin then polished with diamond polishing slurry using a Struers Tegramin 30 polishing unit. Using a Wilson VH1202 Micro-Hardness tester with a 300 gm load and a 50× objective lens, measure 5 diamond indents on five different abrasive particles. Measurement is in Vickers unit, kgf/mm2, and is converted to GPa by multiplying the Vickers number by 0.009807. Average and range of hardness are reported for a suitable sample size to make a statistically relevant calculation.

In certain instances, the abrasive particles including multiphase aluminosilicate may have a certain content of porosity that facilitates improved performance. For example, the abrasive particles may include a porosity of at least 1 vol % for total volume of the abrasive particles, such least 2 vol % or at least 3 vol % or at least 4 vol % or at least 5 vol % or at least 6 vol % or at least 7 vol % or at least 8 vol % or at least 9 vol % or at least 10 vol %. In one non-limiting embodiment the, the abrasive particles, such as those including multiphase aluminosilicate, may have a porosity of not greater than 20 vol % for total volume of the abrasive particles, such as not greater than 18 vol % or not greater than 16 vol % or not greater than 14 vol % or not greater than 12 vol % or not greater than 10 vol % or not greater than 8 vol % or not greater than 6 vol %. It will be appreciated that the content of porosity in the abrasive particles can be within range including any of the minimum and maximum percentages noted above. Furthermore, the percentages noted above are also applicable to the porosity that may exist only within the multiphase aluminosilicate abrasive particles.

The abrasive particles may have a particular density, which may facilitate their uses abrasive particles. For example, the abrasive particles may have a density within a range of at least 2.5 g/cm3 to not greater than 2.8 g/cm3.

In other instances, the abrasive particles comprising multiphase aluminosilicate may have a particular average particle size that may facilitate their use in certain abrasive applications. For example, the abrasive particles may have an average particle size (D50) of at least 1 micron, such as at least 10 microns or at least 20 microns or at least 50 microns or at least 100 microns or at least 200 microns or at least 300 microns or at least 500 microns or at least 800 microns or at least 1000 microns. In another non-limiting embodiment, the average particle size of the abrasive particles can be not greater than 10 mm, such as not greater than 8 mm or not greater than 7 mm or not greater than 6 mm or not greater than 5 mm or not greater than 4 mm or not greater than 3 mm or not greater than 2 mm or not greater than 1 mm or not greater than 800 microns or not greater than 500 microns or not greater than 100 microns. It will be appreciated that the abrasive particles may have an average particle size (D50) within a range including any of the minimum and maximum values noted above, such as within a range of at least 1 micron and not greater than 10 mm.

Figure 2:
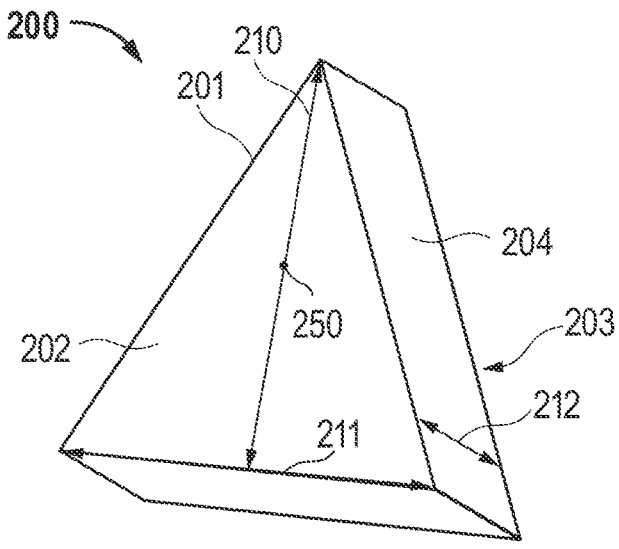
FIGS. 2-5 include perspective view illustrations of abrasive particulates according to embodiments herein.

The abrasive particles may have a variety of sizes and shapes depending upon the intended application. For example, the abrasive particles, such as the abrasive particles including multiphase aluminosilicate can be randomly shaped particles, shaped abrasive particles or constant height abrasive particles. FIG. 2 includes a perspective view illustration of a shaped abrasive particle in accordance with an embodiment. The shaped abrasive particle 200 can include a body 201 including a major surface 202, a major surface 203, and a side surface 204 extending between the major surfaces 202 and 203. As illustrated in FIG. 2, the body 201 of the shaped abrasive particle 200 can be a thin-shaped body, wherein the major surfaces 202 and 203 are larger than the side surface 204. Moreover, the body 201 can include a longitudinal axis 210 extending from a point to a base and through the midpoint 250 on a major surface 202 or 203. The longitudinal axis 210 can define the longest dimension of the body along a major surface and through the midpoint 250 of the major surface 202. In certain particles, if the midpoint of a major surface of the body is not readily apparent, one may view the major surface top-down, draw a closest-fit circle around the two-dimensional shape of the major surface and use the center of the circle as the midpoint of the major surface.

Shaped abrasive particles may be formed through particular processes, including molding, printing, casting, extrusion, and the like. Shaped abrasive particles can be formed such that each particle has substantially the same arrangement of surfaces and edges relative to each other. For example, a group of shaped abrasive particles generally have the same arrangement and orientation and or two-dimensional shape of the surfaces and edges relative to each other. As such, the shaped abrasive particles have a relatively high shape fidelity and consistency in the arrangement of the surfaces and edges relative to each other. Moreover, constant height abrasive particles (CHAPs) can also be formed through particular processes that facilitate formation of thin-shaped bodies that can have irregular two-dimensional shapes when viewing the major surface top-down. See, for example, FIG. 4. CHAPs can have less shape fidelity than shaped abrasive particles, but can have substantially planar and parallel major surfaces separated by a side surface.

By contrast, non-shaped particles (see, for example, FIG. 5) can be formed through different processes and have different shape attributes compared to shaped abrasive particles and CHAPs. For example, non-shaped particles are typically formed by a comminution process wherein a mass of material is formed and then broken or exploded and then sieved to obtain abrasive particles of a certain size. However, a non-shaped particle will have a generally random arrangement of surfaces and edges, and generally will lack any recognizable two-dimensional or three dimensional shape in the arrangement of the surfaces and edges. Moreover, non-shaped particles do not necessarily have a consistent shape with respect to each other, and therefore have a significantly lower shape fidelity compared to shaped abrasive particles or CHAPs. The non-shaped particles generally are defined by a random arrangement of surfaces and edges for each particle and with respect to other non-shaped particles.

Referring again to FIG. 2, the body 201 can further include a lateral axis 1011 defining a width of the body 201 extending generally perpendicular to the longitudinal axis 210 on the same major surface 202. Finally, as illustrated, the body 201 can include a vertical axis 212, which in the context of thin shaped bodies can define a height (or thickness) of the body 201. For thin-shaped bodies, the length of the longitudinal axis 210 is greater than the vertical axis 212. As illustrated, the thickness 212 can extend along the side surface 204 between the major surfaces 202 and 203 and perpendicular to the plane defined by the longitudinal axis 210 and lateral axis 1011. It will be appreciated that reference herein to length, width, and height of the abrasive particles may be reference to average values taken from a suitable sampling size of abrasive particles of a larger group, including for example, a group of abrasive particle affixed to a fixed abrasive.

The shaped abrasive particles of the embodiments herein, including thin-shaped abrasive particles can have a primary aspect ratio of length:width such that the length can be greater than or equal to the width. Furthermore, the length of the body 201 can be greater than or equal to the height. Finally, the width of the body 201 can be greater than or equal to the height. However, in certain other embodiments, the width can be greater than the length. For example, in those embodiments wherein the body 201 is an equilateral triangle, the width can be greater than the length.

The abrasive particulates of the embodiments herein, including the shaped abrasive particles, can include a crystalline material, and more particularly, a polycrystalline material. Notably, the polycrystalline material can include abrasive grains. In one embodiment, the body of the abrasive particle, including for example, the body of a shaped abrasive particle can be essentially free of an organic material, such as, a binder. In at least one embodiment, the abrasive particles can consist essentially of a polycrystalline material. In another embodiment, the abrasive particles, such as shaped abrasive particles can be free of silane, and particularly, may not have a silane coating.

FIG. 2 includes an illustration of a shaped abrasive particle having a two-dimensional shape as defined by the plane of the upper major surface 202 or major surface 203, which has a generally triangular two-dimensional shape. It will be appreciated that the shaped abrasive particles of the embodiments herein are not so limited and can include other two-dimensional shapes. For example, the shaped abrasive particles of the embodiment herein can include particles having a body with a two-dimensional shape as defined by a major surface of the body from the group of shapes including polygons, regular polygons, irregular polygons, irregular polygons including arcuate or curved sides or portions of sides, ellipsoids, numerals, Greek alphabet characters, Latin alphabet characters, Russian alphabet characters, Kanji characters, complex shapes having a combination of polygons shapes, shapes including a central region and a plurality of arms (e.g., at least three arms) extending from a central region (e.g., star shapes), and a combination thereof. Particular polygonal shapes include rectangular, trapezoidal, quadrilateral, pentagonal, hexagonal, heptagonal, octagonal, nonagonal, decagonal, and any combination thereof. In another instance, the finally-formed shaped abrasive particles can have a body having a two-dimensional shape such as an irregular quadrilateral, an irregular rectangle, an irregular trapezoid, an irregular pentagon, an irregular hexagon, an irregular heptagon, an irregular octagon, an irregular nonagon, an irregular decagon, and a combination thereof. An irregular polygonal shape is one where at least one of the sides defining the polygonal shape is different in dimension (e.g., length) with respect to another side. As illustrated in other embodiments herein, the two-dimensional shape of certain shaped abrasive particles can have a particular number of exterior points or external corners. For example, the body of the shaped abrasive particles can have a two-dimensional polygonal shape as viewed in a plane defined by a length and width, wherein the body comprises a two-dimensional shape having at least 4 exterior points (e.g., a quadrilateral), at least 5 exterior points (e.g., a pentagon), at least 6 exterior points (e.g., a hexagon), at least 7 exterior points (e.g., a heptagon), at least 8 exterior points (e.g., an octagon), at least 9 exterior points (e.g., a nonagon), and the like.

Figure 3:
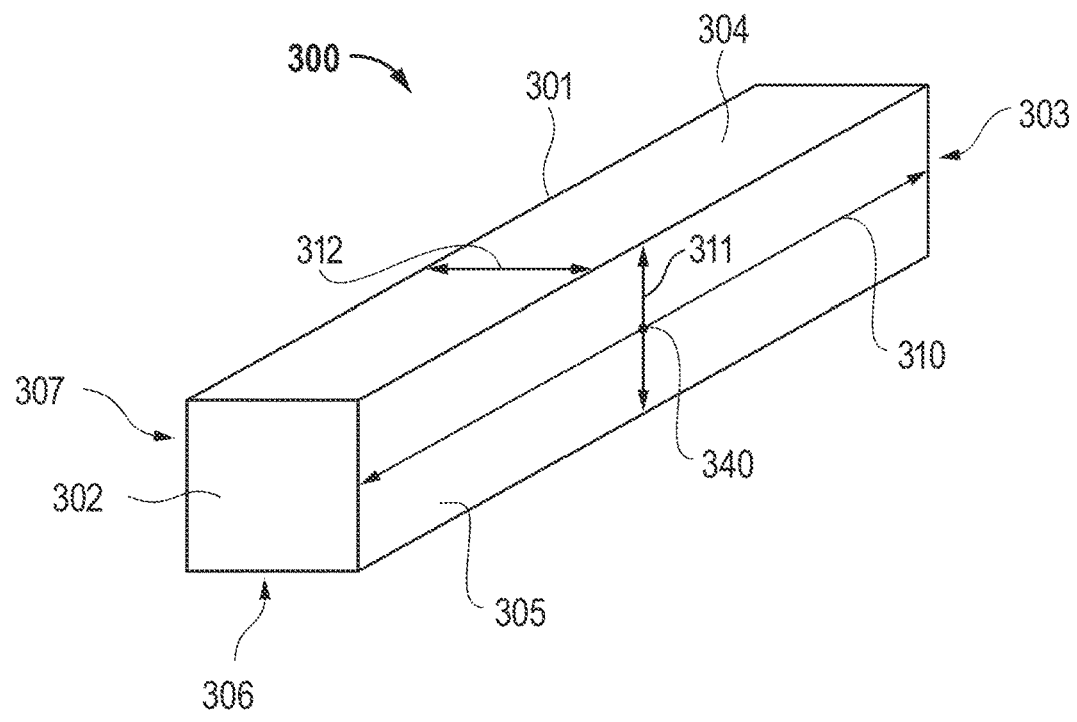

FIG. 3 includes a perspective view illustration of a shaped abrasive particle according to another embodiment. Notably, the shaped abrasive particle 300 can include a body 301 including a surface 302 and a surface 303, which may be referred to as end surfaces 302 and 303. The body 301 can further include major surfaces 304, 305, 306, 307 extending between and coupled to the end surfaces 302 and 303. The shaped abrasive particle of FIG. 3 is an elongated shaped abrasive particle having a longitudinal axis 310 that extends along the major surface 305 and through the midpoint 340 between the end surfaces 302 and 303. For particles having an identifiable two-dimensional shape, such as the shaped abrasive particles of FIGS. 2 and 3, the longitudinal axis is the dimension that would be readily understood to define the length of the body through the midpoint on a major surface. For example, in FIG. 3, the longitudinal axis 310 of the shaped abrasive particle 300 extends between the end surfaces 302 and 303 parallel to the edges defining the major surface as shown. Such a longitudinal axis is consistent with how one would define the length of a rod. Notably, the longitudinal axis 310 does not extend diagonally between the corners joining the end surfaces 302 and 303 and the edges defining the major surface 305, even though such a line may define the dimension of greatest length. To the extent that a major surface has undulations or minor imperfections from a perfectly planar surface, the longitudinal axis can be determined using a top-down, two-dimensional image that ignores the undulations.

It will be appreciated that the surface 305 is selected for illustrating the longitudinal axis 310, because the body 301 has a generally square cross-sectional contour as defined by the end surfaces 302 and 303. As such, the surfaces 304, 305, 306, and 17 can be approximately the same size relative to each other. In the context of other elongated abrasive particles, the surfaces 302 and 303 can have a different shape, for example, a rectangular shape, and as such, at least one of the surfaces 304, 305, 306, and 307 may be larger relative to the others. In such instances, the largest surface can define the major surface and the longitudinal axis would extend along the largest of those surfaces through the midpoint 340 and may extend parallel to the edges defining the major surface. As further illustrated, the body 301 can include a lateral axis 311 extending perpendicular to the longitudinal axis 310 within the same plane defined by the surface 305. As further illustrated, the body 301 can further include a vertical axis 312 defining a height of the abrasive particle, were in the vertical axis 312 extends in a direction perpendicular to the plane defined by the longitudinal axis 310 and lateral axis 311 of the surface 305.

Figure 10:
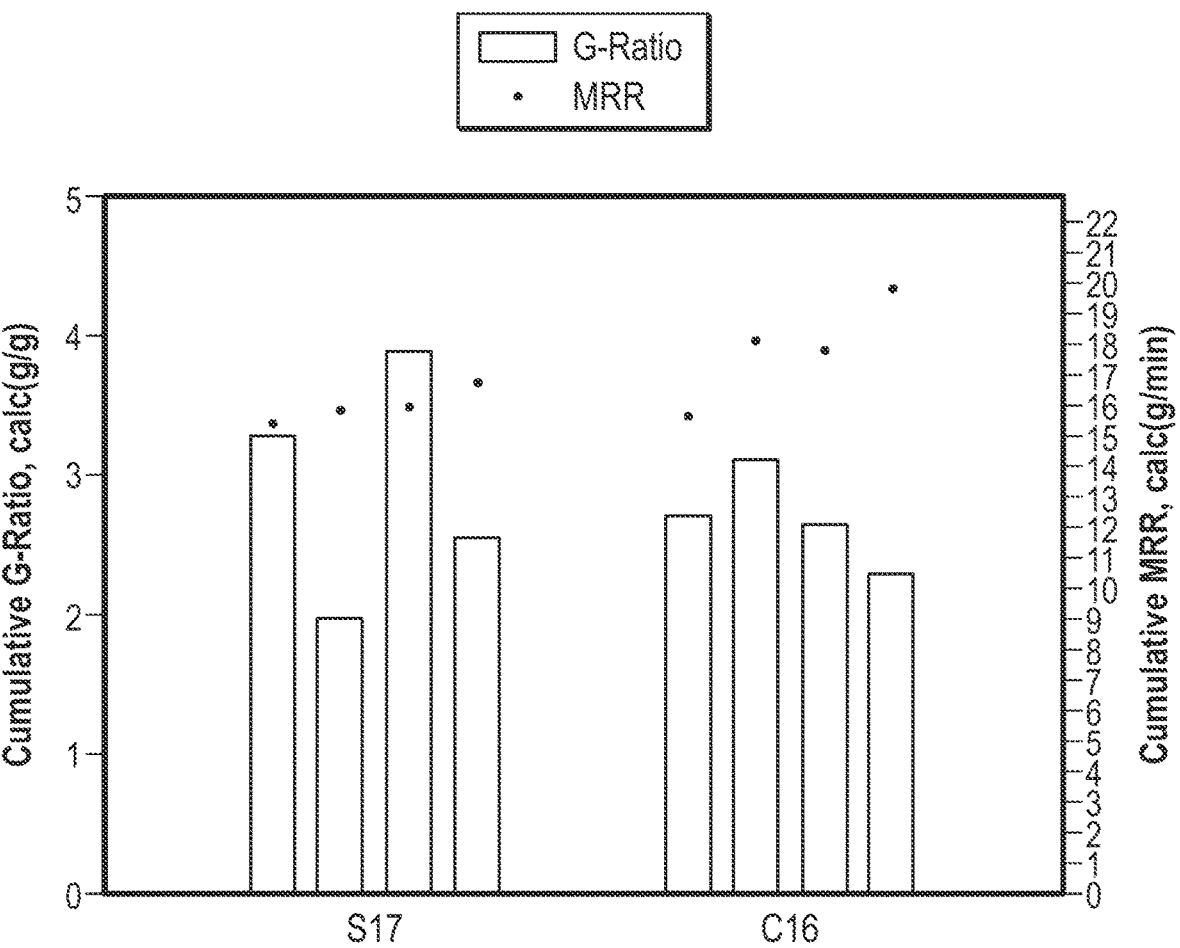
FIG. 10 includes a plot of G-ratio and MRR for samples presented in Example 5.

It will be appreciated that like the thin shaped abrasive particle of FIG. 2, the elongated shaped abrasive particle of FIG. 3 can have various two-dimensional shapes, such as those defined with respect to the shaped abrasive particle of FIG. 10. The two-dimensional shape of the body 301 can be defined by the shape of the perimeter of the end surfaces 302 and 303. The elongated shaped abrasive particle 1100 can have any of the attributes of the shaped abrasive particles of the embodiments herein.

Figure 4:
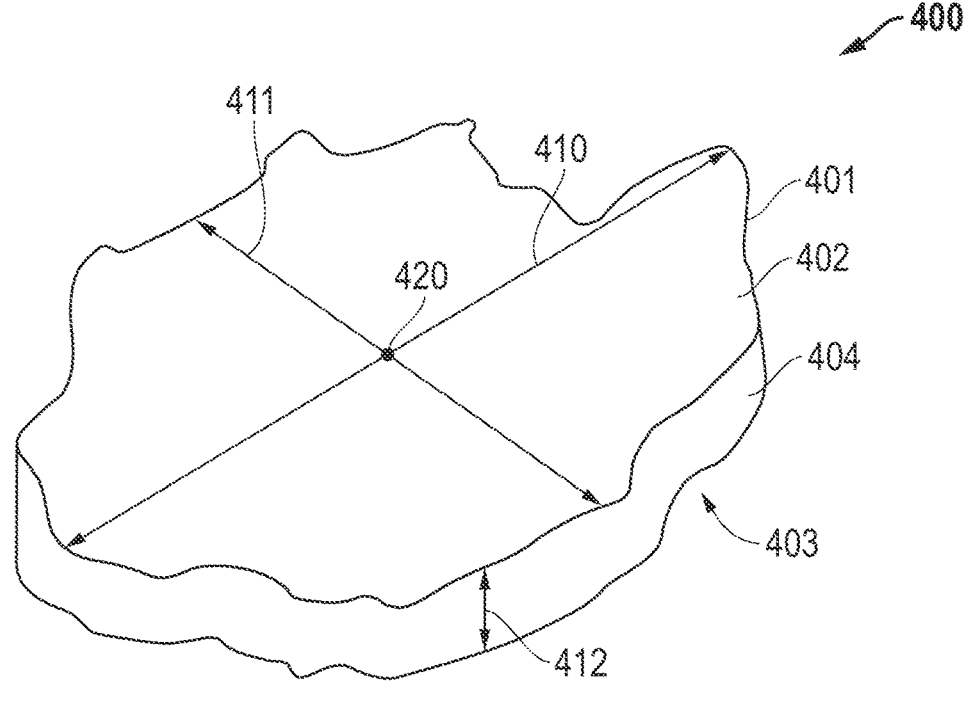

FIG. 4 includes a perspective view illustration of a controlled height abrasive particle (CHAP) according to an embodiment. As illustrated, the CHAP 400 can include a body 401 including a first major surface 402, a second major surface 403, and a side surface 404 extending between the first and second major surfaces 402 and 403. As illustrated in FIG. 4, the body 401 can have a thin, relatively planar shape, wherein the first and second major surfaces 402 and 403 are larger than the side surface 404 and substantially parallel to each other. Moreover, the body 401 can include a longitudinal axis 410 extending through the midpoint 420 and defining a length of the body 401. The body 401 can further include a lateral axis 411 on the first major surface 402, which extends through the midpoint 420 of the first major surface 402, perpendicular to the longitudinal axis 410, and defining a width of the body 401.

The body 401 can further include a vertical axis 412, which can define a height (or thickness) of the body 401. As illustrated, the vertical axis 412 can extend along the side surface 404 between the first and second major surfaces 402 and 403 in a direction generally perpendicular to the plane defined by the axes 410 and 411 on the first major surface. For thin-shaped bodies, such as the CHAP illustrated in FIG. 4, the length can be equal to or greater than the width and the length can be greater than the height. It will be appreciated that reference herein to length, width, and height of the abrasive particles may be referenced to average values taken from a suitable sampling size of abrasive particles of a batch of abrasive particles.

Unlike the shaped abrasive particles of FIGS. 2 and 3, the CHAP of FIG. 4 does not have a readily identifiable two-dimensional shape based on the perimeter of the first or second major surfaces 402 and 403. Such abrasive particles may be formed in a variety of ways, including but not limited to, fracturing of a thin layer of material to form abrasive particles having a controlled height but with irregularly formed, planar, major surfaces. For such particles, the longitudinal axis is defined as the longest dimension on the major surface that extends through a midpoint on the surface. To the extent that the major surface has undulations, the longitudinal axis can be determined using a top-down, two-dimensional image that ignores the undulations. Moreover, as noted above, a closest-fit circle may be used to identify the midpoint of the major surface and identification of the longitudinal and lateral axes.

Figure 5:
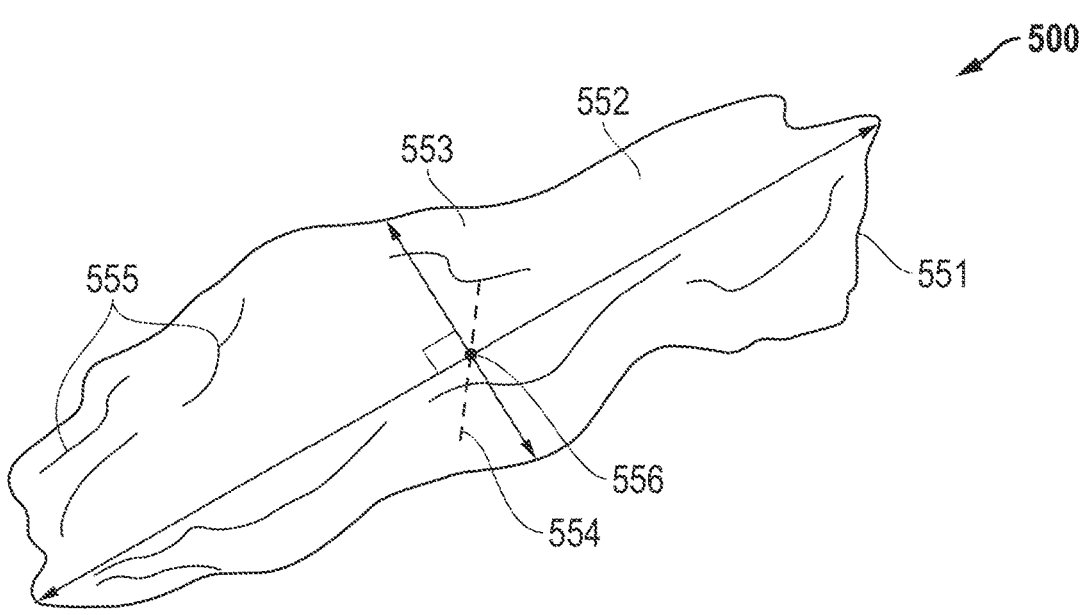

FIG. 5 includes an illustration of a non-shaped particle or randomly-shaped particle, which may be an elongated, non-shaped abrasive particle or a secondary particle, such as a diluent grain, a filler, an agglomerate or the like. The non-shaped particle 550 can have a body 551 including a generally random arrangement of edges 555 extending along the exterior surface of the body 551. The body can further include a longitudinal axis 552 defining the longest dimension of the particle. The longitudinal axis 552 defines the longest dimension of the body as viewed in two-dimensions. Thus, unlike shaped abrasive particles and CHAPs, where the longitudinal axis is measured on the major surface, the longitudinal axis of a non-shaped particle is defined by the points on the body furthest from each other as the particle is viewed in two-dimensions using an image or vantage that provides a view of the particle's longest dimension. That is, an elongated particle, but non-shaped particles, such as illustrated in FIG. 5, should be viewed in a perspective that makes the longest dimension apparent to properly evaluate the longitudinal axis. The body 551 can further include a lateral axis 553 extending perpendicular to the longitudinal axis 552 and defining a width of the particle. The lateral axis 553 can extend perpendicular to the longitudinal axis 552 through the midpoint 556 of the longitudinal axis in the same plane used to identify the longitudinal axis 552. The abrasive particle may have a height (or thickness) as defined by the vertical axis 554. The vertical axis 554 can extend through the midpoint 556 but in a direction perpendicular to the plane used to define the longitudinal axis 552 and lateral axis 553. To evaluate the height, one may have to change the perspective of view of the abrasive particle to look at the particle from a different vantage than is used to evaluate the length and width.

As will be appreciated, the abrasive particle can have a length defined by the longitudinal axis 552, a width defined by the lateral axis 553, and a vertical axis 554 defining a height. As will be appreciated, the body 551 can have a primary aspect ratio of length:width such that the length is equal to or greater than the width. Furthermore, the length of the body 551 can be equal to or greater than or equal to the height. Finally, the width of the body 551 can be greater than or equal to the height 554.

The non-shaped particle 550 can have any of the attributes of abrasive particles described in the embodiments herein, including for example but not limited to, composition, microstructural features (e.g., average grain size), hardness, porosity, and the like.

In certain instances, the bond material may have a particular composition suitable for improved performance of the abrasive article. For example, the bond material may include material from the group of an inorganic material, an organic material, or any combination thereof. In certain instances, the bond material may include a ceramic material, an amorphous material, a metal material, a polymeric material or any combination thereof. In a more particular embodiment, the bond material may include a polymeric material from the group of phenolic resin, epoxy resin, polyester resin, polyurethane, polyester, rubber, polyimide, polybenzimidazole, aromatic polyamide, modified phenolic resin or any combination thereof.

The bonded abrasive body may have various sizes, shapes, and contours depending upon the intended application. In certain instances, the bonded abrasive body may have an aspect ratio (AR=D:t) of at least 10:1, where "D" is the diameter and "t" is the thickness as shown in FIG. 1. In still other instances, the aspect ratio may be greater, such as at least 15:1 or at least 20:1 or at least 35:1 or at least 50:1 or at least 75:1 or at least 100:1 or even at least 125:1. In another embodiment, the aspect ratio of the bonded abrasive body may be not greater than 1000:1, such as not greater than 15:1 or at least 20:1 or at least 35:1 or at least 50:1 or at least 75:1 or at least 100:1 or even at least 125:1. It will be appreciated that the aspect ratio may be within range including any of the minimum maximum ratios provided above.

In another aspect the bonded abrasive body may include a particular content of abrasive particles within the body that may facilitate improved performance. For example, the bonded abrasive body may include at least 1 vol % abrasive particles for a total volume of bonded abrasive body, such as at least 2 vol % or at least about 5 vol % or at least about 8 vol % or at least about 10 vol % or at least about 12 vol % or at least about 15 vol % or at least 18 vol % or at least about 20 vol % or at least about 22 vol % or at least about 25 vol % or at least about 28 vol % or at least about 30 vol %. Still, in other instances, the bonded abrasive body may include not greater than 85 vol % abrasive particles for total volume of the bonded abrasive body, such as not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 18 vol % or not greater than 15 vol % or not greater than 12 vol % or not greater than 10 vol %. It will be appreciated that the content of abrasive particles in the bonded abrasive body may be within range including any of the minimum and maximum percentages noted above, including for example with a range of at least 50 vol % and not greater than 80 vol % abrasive particles for a total volume of the bonded abrasive body.

In other instances, the bonded abrasive body may include certain content of bond material that may facilitate improved performance. For example, the bonded abrasive body may include at least 2 vol % bond material for total volume of bonded abrasive body, such as least 3 vol % or at least about 4 vol % or at least 5 vol % or at least about 6 vol % or at least about 7 vol % or at least about 8 vol % or at least about 9 vol % or at least about 10 vol % or at least about 15 vol % or at least about 20 vol % or at least 25 vol % or at least about 30 vol % or at least about 35 vol % or at least about 40 vol % or at least about 45 vol % or at least about 50 vol % or at least about 55 vol % or at least about 60 vol % or at least 65 vol %. In another instance, the bonded abrasive body may include not greater than 90 vol % bond material for a total volume of the bonded abrasive body, such as not greater than 85 vol % or not greater than 80 vol % or not greater than 70 vol % or not greater than 60 vol % or not greater than 50 vol % or not greater than 40 vol % or not greater than 30 vol % or not greater than 20 vol %. It will be appreciated that the content of bond material in the bonded abrasive body may be within range including any of the minimum and maximum percentages noted above, including for example within range of at least 8 vol % to not greater than 40 vol % bond material for a total volume of the bonded abrasive body.

In another embodiment, particular contents of porosity may be utilized in the bonded abrasive body that may facilitate improved performance. For example, the bonded abrasive body may have a content of porosity of at least 1 vol % porosity for a total volume of the bonded abrasive body, such as at least 2 vol % or at least about 3 vol % or at least about 5 vol % or at least 8 vol % or at least about 10 vol % or at least 12 vol % or at least about 15 vol % or at least about 20 vol % or at least 25 vol % or at least about 30 vol %. In other instances, the body may include not greater than 60 vol % porosity for total volume of the bonded abrasive body, such as not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol %. It will be appreciated that the content of porosity in the bonded abrasive body may be within a range including any of the minimum and maximum percentages noted above, including for example within a range including at least 10 vol % and not greater than 40 vol % porosity for a total volume of the bonded abrasive body.

The bonded abrasive body may be a component of an abrasive article or define the entirety of the abrasive article. The abrasive article may be used in certain material removal operations. For example, in at least one embodiment, a material removal process includes moving the bonded abrasive body relative to workpiece to remove material from the workpiece. The bonded abrasive body may be moved while the workpiece is stationary, the workpiece may be moved while the bonded abrasive body is stationary, or both the bonded abrasive body and workpiece may be moved. In certain aspects, the workpiece may include a non-ferrous metal material, and more particularly, may consist essentially of a non-ferrous metal material. The non-ferrous metal material may be a metal material consisting essentially of a single metal element or include an alloy of a plurality of metal elements. In certain embodiments, the non-ferrous metal material may include at least one element from the group of Al, Sn, Cu, Ag, Ni, Co, Mn, Cr, Ti, Ta, W, Pt, Au, Zn, Mg, Zr or any combination thereof.

In some instances, the workpiece may have a certain hardness, which may be best suited for the abrasive articles of the embodiments herein. For example, the workpiece may have a hardness within a range of 30 HB and not greater than 150 HB. Still in certain other instances, the workpiece may have a certain ductility that may make utilization of the abrasive articles of the embodiments herein most feasible. For example, the workpiece may have a ductility greater than steel.

In an embodiment, the abrasive article can have cumulative G-ratio of at least 1.5 g/g in grinding test on a workpiece as described in this disclosure, such as at least 1.8 g/g, at least at least 2 g/g, at least 2.2 g/g, at least 2.4 g/g, at least 2.6 g/g, at least 2.8 g/g, at least 3 g/g, at least 3.2 g/g, at least 3.5 g/g, at least 4 g/g, at least 4.5 g/g, at least 5 g/g, at least 6 g/g, at least 6 g/g, at least 8 g/g, at least 9 g/g, or at least 12 g/g. In another embodiment, the abrasive article can have cumulative G-ratio of not greater than 35 g/g, not greater than 33 g/g, not greater than 30 g/g, not greater than 28 g/g, not greater than 27 g/g, not greater than 26 g/g, not greater than 25 g/g, not greater than 22 g/g, not greater than 20 g/g, not greater than 18 g/g, not greater than 17 g/g, not greater than 16 g/g, not greater than 15 g/g, not greater than 14 g/g, not greater than 13 g/g, not greater than 12 g/g, not greater than 11 g/g, not greater than 10 g/g, not greater than 9 g/g, not greater than 8 g/g, not greater than 7 g/g, or not greater than 5 g/g. Moreover, the abrasive article can have cumulative G-ratio in a range including any of the minimum and maximum values noted herein.

In an embodiment, the abrasive article can have cumulative material removal rate of at least 3 g/min in grinding test on a workpiece as described in this disclosure, such as at least 3.5 g/min, at least at least 3.8 g/min, at least 4 g/min, at least 4.3 g/min, at least 4.6 g/min, at least 4.8 g/min, at least 5 g/min, at least 5.3 g/min, at least 5.5 g/min, at least 5.8 g/min, at least 6 g/min, at least 6.5 g/min, at least 6.8 g/min, at least 7 g/min, at least 7.3 g/min, at least 7.5 g/min, or at least 8 g/min. In another embodiment, the abrasive article can have cumulative material removal rate of not greater than 15 g/min, not greater than 14 g/min, not greater than 13 g/min, not greater than 12 g/min, not greater than 11 g/min, or not greater than 10 g/min. Moreover, the abrasive article can have cumulative material removal rate in a range including any of the minimum and maximum values noted herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. An abrasive article comprising:
a bonded abrasive body including abrasive particles contained within a bond material, wherein at least a portion of the abrasive particles comprise a multiphase aluminosilicate.

Embodiment 2. The abrasive article of embodiment 1, wherein a majority of the abrasive particles are contained in and surrounded by the bond material that defines a three-dimensional network extending throughout the bonded abrasive body.

Embodiment 3. The abrasive article of embodiment 1, wherein at least 10 vol % of the abrasive particles comprise multiphase aluminosilicate for a total volume of the abrasive particles or at least 20 vol % or at least 30 vol % or at least 40 vol % or at least 50 vol % or at least 60 vol % or at least 70 vol % or at least 80 vol % or at least 90 vol % or at least 95 vol %.

Embodiment 4. The abrasive article of embodiment 1, wherein not greater than 99 vol % of the abrasive particles comprise multiphase aluminosilicate or not greater than 95 vol % or not greater than 90 vol % or not greater than 80 vol % or not greater than 70 vol % or not greater than 60 vol % or not greater than 50 vol % or not greater than 40 vol % or not greater than 30 vol % or not greater than 20 vol % or not greater than 10 vol %.

Embodiment 5. The abrasive article of embodiment 1, wherein the multiphase aluminosilicate comprises a first phase comprising a polycrystalline aluminosilicate and a second phase comprising an amorphous phase, wherein the amorphous phase is disposed at the grain boundaries between the grains of the polycrystalline aluminosilicate, wherein the multiphase aluminosilicate is a calcined kaolin, wherein the multiphase aluminosilicate is Molochite™, wherein essentially all of the abrasive particles comprise multiphase aluminosilicate Embodiment 6. The abrasive article of embodiment 1, wherein the abrasive particles include a blend, including a first group of abrasive particles comprising multiphase aluminosilicate and a second group of abrasive particles comprising at least one material selected from the group consisting of oxides, carbides, nitrides, borides, diamond, or any combination thereof.

Embodiment 7. The abrasive article of embodiment 6, wherein the second group of abrasive particles include at least one material selected from the group consisting of silicon carbide, alumina, or a combination thereof.

Embodiment 8. The abrasive article of embodiment 6, wherein the second group of abrasive particles comprises agglomerated particles.

Embodiment 9. The abrasive article of embodiment 6, wherein the second group of abrasive particles comprises unagglomerated particles.

Embodiment 10. The abrasive article of embodiment 6, wherein the portion of abrasive particles comprising multiphase aluminosilicate includes abrasive agglomerates comprising multiphase aluminosilicate.

Embodiment 11. The abrasive article of embodiment 6, wherein the portion of abrasive particles comprising multiphase aluminosilicate includes unagglomerated particles comprising multiphase aluminosilicate.

Embodiment 12. The abrasive article of embodiment 6, wherein the blend includes at least 10 vol % of the second group of abrasive or at least 20 vol % or at least 30 vol % or at least 40 vol % or at least 50 vol % or at least 60 vol % or at least 70 vol % or at least 80 vol % or at least 90 vol % or at least 95 vol %.

Embodiment 13. The abrasive article of embodiment 6, wherein the blend includes not greater than 99 vol % of the second group of abrasive particles or not greater than 95 vol % or not greater than 90 vol % or not greater than 80 vol % or not greater than 70 vol % or not greater than 60 vol % or not greater than 50 vol % or not greater than 40 vol % or not greater than 30 vol % or not greater than 20 vol % or not greater than 10 vol %.

Embodiment 14. The abrasive article of embodiment 1, wherein the multiphase aluminosilicate comprises two phases, a first polycrystalline phase and a second amorphous phase.

Embodiment 15. The abrasive article of embodiment 14, wherein the multiphase aluminosilicate comprises at least 5 mass % of the first phase for a total mass of the multiphase aluminosilicate or at least 10 mass % or at least 20 mass % or at least 30 mass % or at least 40 mass % or at least 50 mass % or at least 60 mass % or at least 70 mass % or at least 80 mass % or at least 90 mass % or at least 95 mass %.

Embodiment 16. The abrasive article of embodiment 14, wherein the multiphase aluminosilicate comprises not greater than 99 mass % of the first phase for a total mass of the multiphase aluminosilicate or not greater than 98 mass % or not greater than 96 mass % or not greater than 94 mass % or not greater than 90 mass % or not greater than 80 mass % or not greater than 70 mass % or not greater than 60 mass % or not greater than 50 mass % or not greater than 40 mass % or not greater than 30 mass % or not greater than 20 mass % or not greater than 10 mass %.

Embodiment 17. The abrasive article of embodiment 14, wherein the multiphase aluminosilicate comprises at least 5 mass % of the second phase for a total mass of the multiphase aluminosilicate or at least 10 mass % or at least 20 mass % or at least 30 mass % or at least 40 mass % or at least 50 mass % or at least 60 mass % or at least 70 mass % or at least 80 mass % or at least 90 mass %.

Embodiment 18. The abrasive article of embodiment 14, wherein the multiphase aluminosilicate comprises not greater than 90 mass % of the second phase for a total mass of the multiphase aluminosilicate or not greater than 80 mass % or not greater than 70 mass % or not greater than 60 mass % or not greater than 50 mass % or not greater than 40 mass % or not greater than 30 mass % or not greater than 20 mass % or not greater than 15 mass % or not greater than 10 mass % or not greater than 5 mass %.

Embodiment 19. The abrasive article of embodiment 14, further comprising a content ratio (Cr=C1/C2) of at least 0.1, wherein C1 is the mass percent of the first phase in the multiphase aluminosilicate and C2 is the mass percent of the second phase in the multiphase aluminosilicate, wherein the content ratio (Cr) is at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5.

Embodiment 20. The abrasive article of embodiment 14, further comprising a content ratio (Cr=C1/C2) of not greater than 4, wherein C1 is the mass percent of the first phase in the multiphase aluminosilicate and C2 is the mass percent of the second phase in the multiphase aluminosilicate, wherein the content ratio (Cr) is not greater than 3.5 or not greater than 3 or not greater than 2.5 or not greater than 2 or not greater than 1.9 or not greater than 1.8 or not greater than 1.7 or not greater than 1.6 or not greater than 1.5 or not greater than 1.4 or not greater than 1.3 or not greater than 1.2 or not greater than 1.1 or not greater than 1 or not greater than 0.9 or not greater than 0.8 or not greater than 0.7 or not greater than 0.6 or not greater than 0.5 or not greater than 0.4 or not greater than 0.3 or not greater than 0.2.

Embodiment 21. The abrasive article of embodiment 14, wherein the first phase comprises an aluminosilicate material.

Embodiment 22. The abrasive article of embodiment 14, wherein the first phase comprises an average crystallite size within a range of at least 1 nm to not greater than 1000 microns.

Embodiment 23. The abrasive article of embodiment 1, wherein the multiphase aluminosilicate comprises at least 10 mass % of alumina ($Al_2O_3$) for a total mass of the multiphase aluminosilicate or at least 20 mass % or at least 30 mass % or at least 40 mass % or at least 42 mass % or at least 44 mass % or at least 46 mass % or at least 48 mass %.

Embodiment 24. The abrasive article of embodiment 1, wherein the multiphase aluminosilicate comprises not greater than 65 mass % alumina ($Al_2O_3$) for a total mass of the multiphase aluminosilicate or not greater than 60 mass % or not greater than 55 mass % or not greater than 50 mass % or not greater than 48 mass % or not greater than 45 mass % or not greater than 42 mass % or not greater than 40 mass %.

Embodiment 25. The abrasive article of embodiment 1, wherein the multiphase aluminosilicate comprises at least 10 mass % of silica ($SiO_2$) for a total mass of the multiphase aluminosilicate or at least 20 mass % or at least 30 mass % or at least 40 mass % or at least 45 mass % or at least 50 mass % or at least 52 mass % or at least 54 mass % or at least 56 mass % or at least 58 mass % or at least 60 mass %.

Embodiment 26. The abrasive article of embodiment 1, wherein the multiphase aluminosilicate comprises not greater than 80 mass % silica ($SiO_2$) for a total mass of the multiphase aluminosilicate or not greater than 70 mass % or not greater than 60 mass % or not greater than 58 mass % or not greater than 56 mass % or not greater than 54 mass % or not greater than 52 mass % or not greater than 50 mass %.

Embodiment 27. The abrasive article of embodiment 1, wherein the multiphase aluminosilicate comprises at least 0.5 mass % potassium oxide ($K_2O$) for a total mass of the multiphase aluminosilicate or at least 0.8 mass % or at least 1 mass % or at least 1.2 mass % or at least 1.5 mass % or at least 1.8 mass % or at least 2 mass % or at least 2.5 mass %.

Embodiment 28. The abrasive article of embodiment 1, wherein the multiphase aluminosilicate comprises not greater than 8 mass % potassium oxide (K2O) for a total mass of the multiphase aluminosilicate or not greater than 5 mass % or not greater than 4 mass % or not greater than 3 mass % or not greater than 2.5 mass %.

Embodiment 29. The abrasive article of embodiment 1, wherein the multiphase aluminosilicate comprises at least 0.5 mass % iron oxide ($Fe_2O_3$) for a total mass of the multiphase aluminosilicate or at least 0.8 mass % or at least 1 mass % or at least 1.2 mass % or at least 1.5 mass % or at least 1.8 mass % or at least 2 mass %.

Embodiment 30. The abrasive article of embodiment 1, wherein the multiphase aluminosilicate comprises not greater than 8 mass % iron oxide ($Fe_2O_3$) for a total mass of the multiphase aluminosilicate or not greater than 5 mass % or not greater than 4 mass % or not greater than 3 mass % or not greater than 2.5 mass % or not greater than 2 mass % or not greater than 1.8 mass % or not greater than 1.5 mass %.

Embodiment 31. The abrasive article of embodiment 1, wherein the multiphase aluminosilicate comprises at least 0.1 mass % of a total of titanium oxide ($TiO_2$), calcium oxide (CaO), and magnesium oxide (MgO) for a total mass of the multiphase aluminosilicate or at least 0.2 mass % or at least 0.3 mass % or at least 0.4 mass % or at least 0.5 mass % or at least 0.6 mass %.

Embodiment 32. The abrasive article of embodiment 1, wherein the multiphase aluminosilicate comprises not greater than 2 mass % of a total of titanium oxide ($TiO_2$), calcium oxide (CaO), and magnesium oxide (MgO) for a total mass of the multiphase aluminosilicate or not greater than 1 mass % or not greater than 0.8 mass % or not greater than 0.6 mass %.

Embodiment 33. The abrasive article of embodiment 1, wherein the multiphase aluminosilicate comprises a Mohs hardness within a range of at least 6 and not greater than 9.

Embodiment 34. The abrasive article of embodiment 1, wherein the portion of the abrasive particles comprises a porosity of at least 1 vol % for a total volume of the portion of the abrasive particles or at least 2 vol % or at least 3 vol % or at least 4 vol % or at least 5 vol % or at least 6 vol % or at least 7 vol % or at least 8 vol % or at least 9 vol % or at least 10 vol %.

Embodiment 35. The abrasive article of embodiment 1, wherein the portion of the abrasive particles comprises a porosity of not greater than 20 vol % for a total volume of the portion of the abrasive or not greater than 18 vol % or not greater than 16 vol % or not greater than 14 vol % or not greater than 12 vol % or not greater than 10 vol % or not greater than 8 vol % or not greater than 6 vol %.

Embodiment 36. The abrasive article of embodiment 1, wherein the portion of the abrasive particles comprises a density within a range of at least 2.5 g/cm3 to not greater than 2.8 g/cm3.

Embodiment 37. The abrasive article of embodiment 1, wherein the portion of the abrasive particles comprises an average particle size (D50) within a range of at least 1 micron to not greater than 10 mm.

Embodiment 38. The abrasive article of embodiment 1, wherein the portion of abrasive particles comprises a plurality of particles having random three-dimensional shapes compared to each other.

Embodiment 39. The abrasive article of embodiment 1, wherein the bond material comprises a material selected from the group consisting of inorganic material, organic material, or any combination thereof.

Embodiment 40. The abrasive article of embodiment 1, wherein the bond material comprises a material selected from the group consisting of ceramic, amorphous, polymeric or a combination thereof.

Embodiment 41. The abrasive article of embodiment 1, wherein the bond material comprises a polymeric material selected from the group consisting of phenolic resin, epoxy resin, polyester resin, polyurethane, polyester, rubber, polyimide, polybenzimidazole, aromatic polyamide, modified phenolic resin or any combination thereof.

Embodiment 42. The abrasive article of embodiment 1, wherein the bonded abrasive body comprises an aspect ratio AR=D:t of at least 10:1, wherein "D" is the diameter and "t" is the thickness or an aspect ratio of at least 15:1 or at least 20:1 or at least 35:1 or at least 50:1 or at least 75:1 or at least 100:1 or even at least 125:1.

Embodiment 43. The abrasive article of embodiment 1, wherein the bonded abrasive body comprises an aspect ratio AR=D:t of not greater than 1000:1, wherein "D" is the diameter and "t" is the thickness or not greater than 800:1 or not greater than 500:1 or not greater than 300:1 or not greater than 200:1 or not greater than 100:1 or not greater than 75:1 or not greater than 50:1 or not greater than 35:1 or not greater than 25:1 or not greater than 20:1 or not greater than 15:1.

Embodiment 44. The abrasive article of embodiment 1, wherein the bonded abrasive body includes at least 1 vol % abrasive particles for a total volume of the bonded abrasive body or at least 2 vol % or at least about 5 vol % or at least about 8 vol % or at least about 10 vol % or at least about 12 vol % or at least about 15 vol % or at least 18 vol % or at least about 20 vol % or at least about 22 vol % or at least about 25 vol % or at least about 28 vol % or at least about 30 vol %.

Embodiment 45. The abrasive article of embodiment 1, wherein the bonded abrasive body includes not greater than 85 vol % abrasive particles for a total volume of the bonded abrasive body or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 18 vol % or not greater than 15 vol % or not greater than 12 vol % or not greater than 10 vol %.

Embodiment 46. The abrasive article of embodiment 1, wherein the bonded abrasive body includes at least 2 vol % bond material for a total volume of the bonded abrasive body or at least about 3 vol % or at least about 4 vol % or at least 5 vol % or at least about 6 vol % or at least about 7 vol % or at least about 8 vol % or at least about 9 vol % or at least about 10 vol % or at least about 15 vol % or at least about 20 vol % or at least 25 vol % or at least about 30 vol % or at least about 35 vol % or at least about 40 vol % or at least about 45 vol % or at least about 50 vol % or at least about 55 vol % or at least about 60 vol % or at least 65 vol %.

Embodiment 47. The abrasive article of embodiment 1, wherein the bonded abrasive body includes not greater than 90 vol % bond material for a total volume of the bonded abrasive body or not greater than 85 vol % or not greater than 80 vol % or not greater than 70 vol % or not greater than 60 vol % or not greater than 50 vol % or not greater than 40 vol % or not greater than 30 vol % or not greater than 20 vol %.

Embodiment 48. The abrasive article of embodiment 1, wherein the bonded abrasive body includes at least 1 vol % porosity for a total volume of the bonded abrasive body or at least 2 vol % or at least about 3 vol % or at least about 5 vol % or at least 8 vol % or at least about 10 vol % or at least 12 vol % or at least about 15 vol % or at least about 20 vol % or at least 25 vol % or at least about 30 vol %.

Embodiment 49. The abrasive article of embodiment 1, wherein the bonded abrasive body includes not greater than 60 vol % porosity for a total volume of the bonded abrasive body or not greater than 55 vol % or not greater than 50 vol % or not greater than 45 vol % or not greater than 40 vol % or not greater than 35 vol % or not greater than 30 vol % or not greater than 25 vol % or not greater than 20 vol % or not greater than 15 vol % or not greater than 10 vol % or not greater than 5 vol %.

Embodiment 50. A method for conducting a material removal process comprising:

moving a bonded abrasive body relative to a workpiece comprising a non-ferrous metal material, wherein the bonded abrasive body includes abrasive particles contained within a bond material, wherein at least a portion of the abrasive particles comprise multiphase aluminosilicate.

Embodiment 51. The method of embodiment 50, wherein the workpiece consists of the non-ferrous metal material.

Embodiment 52. The method of embodiment 51, wherein the workpiece comprises a hardness within a range of at least 30 HB and not greater than 150 HB.

Embodiment 53. The method of embodiment 51, wherein the workpiece comprises a ductility greater than steel.

Embodiment 54. The method of embodiment 50, wherein the non-ferrous metal material comprises at least one element selected from the group consisting of Al, Sn, Cu, Ag, Ni, Co, Mn, Cr, Ti, Ta, W, Pt, Au, Zn, Mg, or any combination thereof.

Embodiment 55. The method of embodiment 50, wherein a majority of the abrasive particles are contained in and surrounded by the bond material that defines a three-dimensional network extending throughout the bonded abrasive body.

Embodiment 56. The method of embodiment 50, wherein at least 10 vol % and not greater than 99 vol % of the abrasive particles comprise multiphase aluminosilicate.

Embodiment 57. The method of embodiment 50, wherein essentially all of the abrasive particles comprise multiphase aluminosilicate.

Embodiment 58. The method of embodiment 50, wherein the abrasive particles include a blend, including a first group of abrasive particles comprising multiphase aluminosilicate and a second group of abrasive particles comprising at least one material selected from the group consisting of oxides, carbides, nitrides, borides, diamond, or any combination thereof.

Embodiment 59. The method of embodiment 50, wherein the blend includes at least 10 vol % and not greater than 99 vol % of the second group of abrasive.

Embodiment 60. The method of embodiment 50, wherein the multiphase aluminosilicate comprises two phases, a first polycrystalline phase and a second amorphous phase.

Embodiment 61. The method of embodiment 60, wherein the multiphase aluminosilicate comprises at least 5 vol % and not greater than 99 vol % of the first phase and at least 5 vol % and not greater than 90 vol % of the second phase.

Embodiment 62. The method of embodiment 60, further comprising a content ratio (Cr=C1/C2) of at least 0.1 and not greater than 4, wherein C1 is the mass percent of the first phase in the multiphase aluminosilicate and C2 is the mass percent of the second phase in the multiphase aluminosilicate.

Embodiment 63. The method of embodiment 50, wherein the multiphase aluminosilicate comprises at least one of:

at least 10 mass % and not greater than 65 mass % of alumina (Al2O3) for a total mass of the multiphase aluminosilicate;

at least 10 mass % and not greater than 80 mass % of silica (SiO2) for a total mass of the multiphase aluminosilicate;

at least 0.5 mass % and not greater than 8 mass % potassium oxide ($K_2O$) for a total mass of the multiphase aluminosilicate;

at least 0.5 mass % and not greater than 8 mass % iron oxide ($Fe_2O_3$) for a total mass of the multiphase aluminosilicate;

at least 0.1 mass % and not greater than 2 mass % of a total of titanium oxide ($TiO_2$), calcium oxide (CaO), and magnesium oxide (MgO) for a total mass of the multiphase aluminosilicate; or any combination thereof.

Embodiment 64. The method of embodiment 50, wherein the multiphase aluminosilicate comprises at least one of:

a Mohs hardness between 6 and 9;

a porosity of at least 1 vol % and not greater than 20 vol % for a total volume of the portion of abrasive particles comprising multiphase aluminosilicate;

a density within a range of at least 2.5 g/cm3 to not greater than 2.8 g/cm3;

an average particle size (D50) within a range of at least 1 micron to not greater than 10 mm; or any combination thereof.

Embodiment 65. The method of embodiment 50, wherein the bond material comprises a material selected from the group consisting of inorganic material, organic material, or any combination thereof.

Embodiment 66. The method of embodiment 50, wherein the bonded abrasive body comprises an aspect ratio AR=D:t of at least 10:1 and not greater than 1000:1, wherein "D" is the diameter and "t" is the thickness.

Embodiment 67. The method of embodiment 50, wherein the bonded abrasive body includes at least one of:

at least 1 vol % and not greater than 85 vol % abrasive particles for a total volume of the bonded abrasive body;

at least 2 vol % and not greater than 90 vol % bond material for a total volume of the bonded abrasive body;

at least 1 vol % and not greater than 60 vol % porosity for a total volume of the bonded abrasive body.

EXAMPLES

Example 1

A first abrasive sample (Sample S1) in the form of a grinding wheel is formed to include 32 vol % bond material of phenolic resin (21% of resol and 79% of novolac), 60 vol % abrasive particles available as Molochite™, and 8 vol % porosity. The multiphase aluminosilicate material included approximately 55 mass % of a first polycrystalline phase of mullite and 45 mass % of an amorphous silica phase.

Two comparatives samples of bonded abrasives were also created having the same grade and structure as Sample S1. The first comparative sample (Sample C1) included brown fused alumina grain instead of the multiphase aluminosilicate abrasive particles of Sample S1. The second comparative sample (Sample C2) included abrasive particles of silicon carbide instead of the multiphase aluminosilicate abrasive particles of Sample S1.

Figure 6:
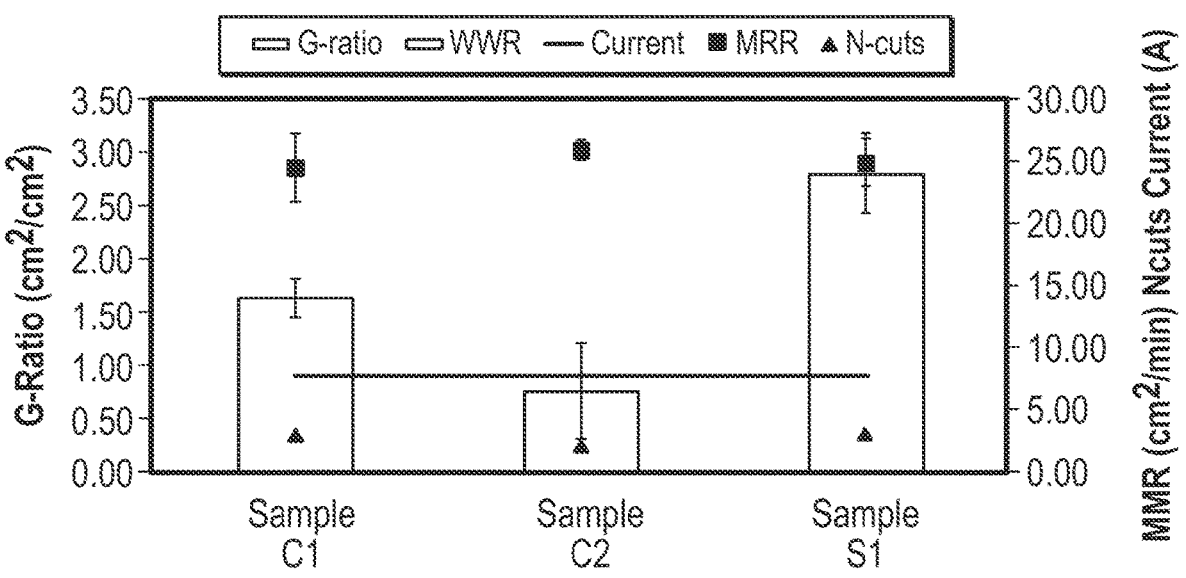
FIG. 6 includes a plot of G-ratio and MRR for samples presented in Example 1.

FIG. 6 includes a plot of G-ratio and material removal rate for each of the samples. The test was conducted on a workpiece of aluminum 6082 having dimensions of 150 mm×15 mm in a cut-off application on a Bosch 17-125ci (1700 W) grinder. As illustrated, Sample S1 demonstrated an unexpected and significant improvement over the comparative samples.

Example 2

Figure 7A:
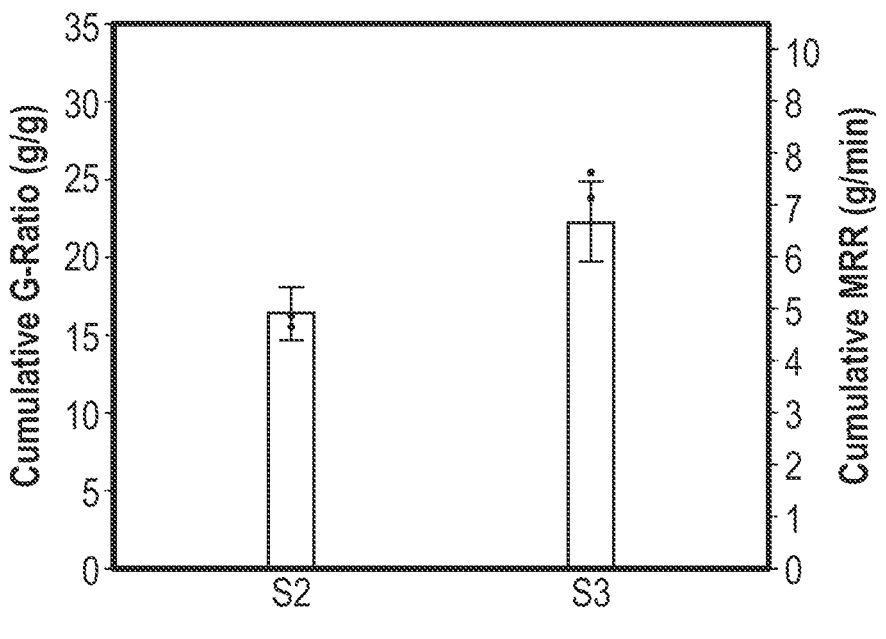
FIG. 7A includes a plot of G-ratio and MRR for samples presented in Example 2.
Figure 7B:
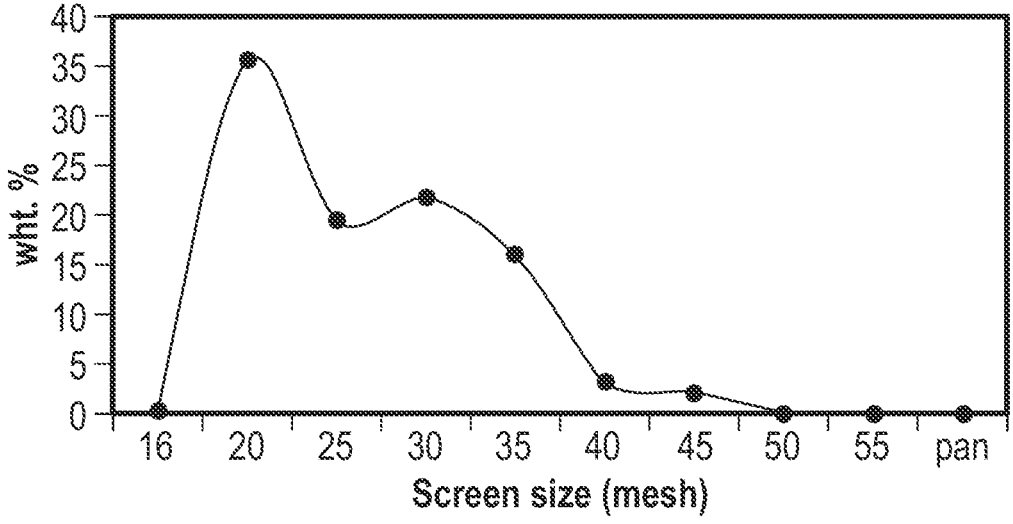
FIG. 7B includes an illustration of particle size distribution.

Abrasive samples, Samples S2 and S3 in the form of grinding wheels were formed to include the same composition except that the abrasive particles of S2 are finer than the abrasive particles of S3. The abrasive particles of both samples are available as Molochite™. The grinding wheel samples were tested on Alu6082 workpieces. As illustrated in FIG. 7A, Sample S3 demonstrated improved G-Ratio and MRR compared to Sample S2. FIG. 7B includes an illustration of particle size distribution of abrasive particles of Sample S3.

Example 3

Abrasive samples, Samples S4 and S5 and comparison Sample C3 in the form of cutoff wheels were formed to include the same composition except that the cutoff wheel samples had different abrasive particles. The abrasive particles of Sample S4 are the same as Sample S1. Sample S5 included a blend of SiC particles and multiphase aluminosilicate particles that are the same as the abrasive particles of Sample S1. Sample C3 included the same SiC abrasive particles as Sample S5.

Figure 8:
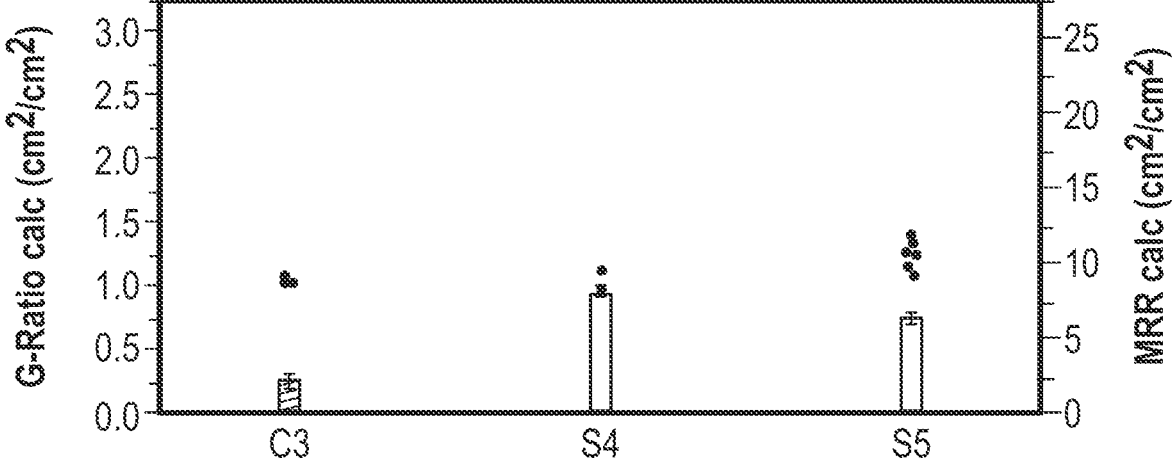
FIG. 8 includes a plot of G-ratio and MRR for samples presented in Example 3.

The cutoff wheel samples were tested on Alu6082 workpieces. As illustrated in FIG. 8, Sample S4 had highest G-Ratio compared to Sample S5 and C3, while both Samples S4 and S5 demonstrated improved G-Ratio over Sample C3. Samples S4 and S5 and Sample C3 had comparable MRR.

Example 4

Abrasive samples, Samples C5 and S6 to S15 in the form of grinding wheels were formed to include about 38 vol % bond material of phenolic resin (28% of resole and 72% of novolac), about 52 vol % abrasive particles, and about 10 vol % porosity. The wheels have the dimension of 5"×¼"×⅞". Sample C5 is made with brown fused alumina abrasive particles. Sample S15 is made with particles available as Molochite™, and Samples S6 to S14 are made with a blend of brown fused alumina abrasive particles and particles of Molochite™ The volume percentages of the two types of particles for a total volume of the particles for each sample are noted in Table 1 below. The multiphase aluminosilicate material included approximately 55 mass % of a first polycrystalline phase of mullite and 45 mass % of an amorphous silica phase. The grinding wheel samples were tested on grinding 1018 carbon steel having the dimension of 12"×0.5". DeWalt DW831 grinder was used. Grinding was performed for 10 minutes per wheel using 10-12 amps.

TABLE 1

| Sample | Vol % of brown fused alumina | Vol % of Molochite ™ |
|---|---|---|
| S6 | 90 | 10 |
| S7 | 80 | 20 |
| S8 | 70 | 30 |
| S9 | 60 | 40 |
| S10 | 50 | 50 |
| S11 | 40 | 60 |
| S12 | 30 | 70 |
| S13 | 20 | 80 |
| S14 | 10 | 90 |

Figure 9:
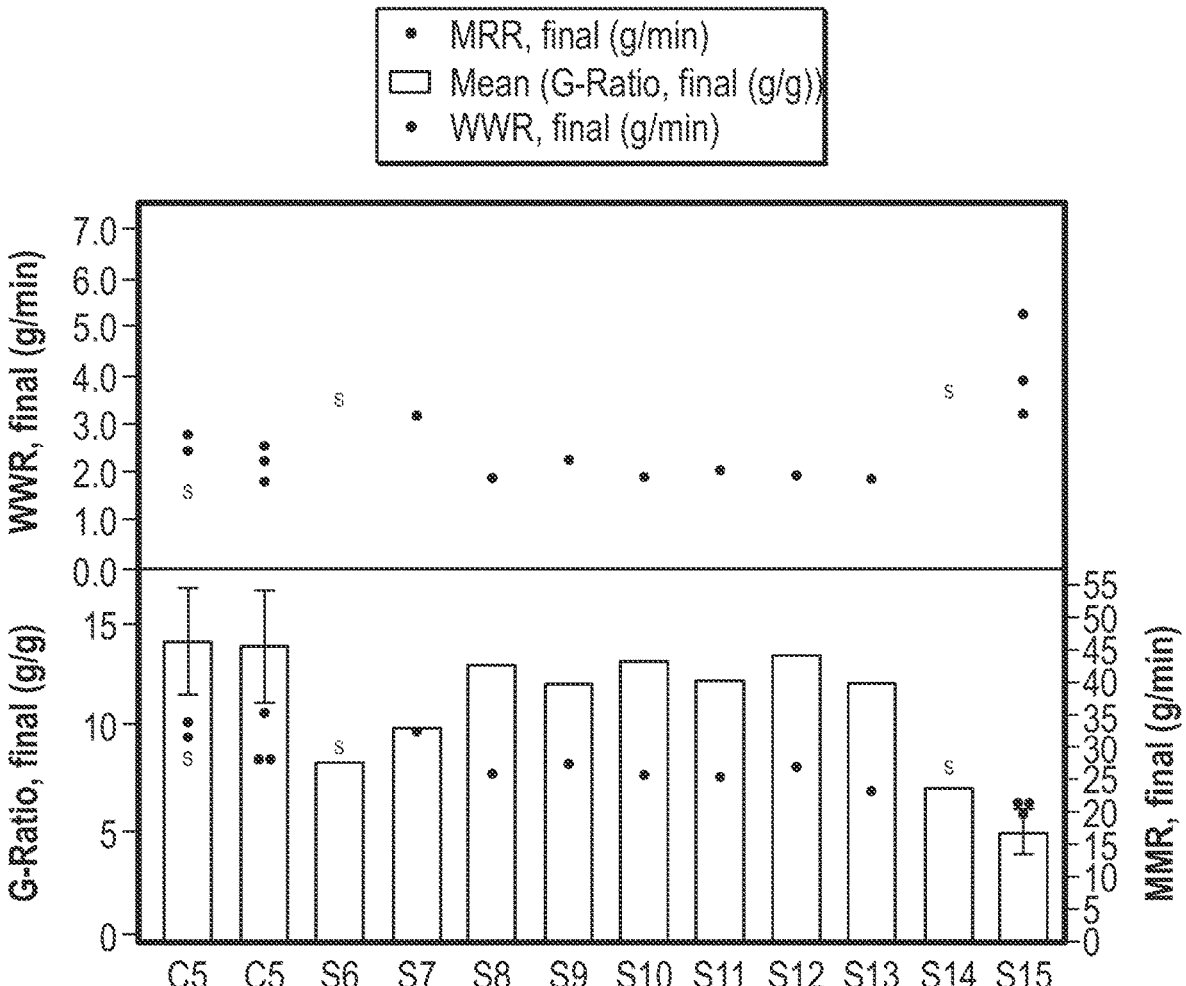
FIG. 9 includes a plot of G-ratio and MRR for samples presented in Example 4.

As illustrated in FIG. 9 and noted in Table 2 below, Samples S8 to S13 unexpectedly demonstrated similar G-Ratio, wheel wear rate, and material removal rate compared to Sample C5.

TABLE 2

| Samples | MRR, final (g/min) | WWR, final (g/min) | G-Ratio, final (g/g) |
|---|---|---|---|
| S6 | 30.15 | 3.58 | 8.421788 |
| S7 | 32.2 | 3.18 | 10.12579 |
| S8 | 25.7 | 1.94 | 13.24742 |
| S9 | 27.2 | 2.24 | 12.14286 |
| S10 | 25.35 | 1.91 | 13.27225 |
| S11 | 25.15 | 2.04 | 12.32843 |
| S12 | 26.7 | 1.96 | 13.62245 |
| S13 | 23 | 1.88 | 12.23404 |
| S14 | 27.1 | 3.78 | 7.169312 |
| S15 | 20.7 | 5.26 | 3.935361 |
| S15 | 19.35 | 3.21 | 6.028037 |
| S15 | 21.45 | 3.88 | 5.528351 |
| C5 | 32.95 | 2.44 | 13.5041 |
| C5 | 28.4 | 1.67 | 17.00599 |
| C5 | 31.25 | 2.58 | 12.1124 |
| C5 | 27.75 | 2.53 | 10.96838 |
| C5 | 27.85 | 1.82 | 15.3022 |
| C5 | 35.2 | 2.23 | 15.78475 |

Example 5

Abrasive samples, Samples C16 and S17 in the form of grinding wheels were formed to include about 32 vol % bond material of phenolic resin (21% of resole and 79% of novolac), about 60 vol % abrasive particles, and about 8 vol % porosity. Wheels had the dimensions of 5"×¼"×⅞". Sample C16 was made with mullite abrasive particles available as Duramul EG from Washington Mills. Sample S17 was made with particles available as Molochite™. Average density and Vickers hardness of mullite particles and Molochite™ is included in Table 3 below.

TABLE 3

| Sample: | Vickers Hardness (at 300 g), average (kgf/mm$^2$) | Density average (g/mL): |
|---|---|---|
| Molochite | 819.9 | 2.6097 |
| Duramul EG 16/35 | 1262.2 | 3.1136 |

FIG. 10 includes a plot of G-ratio and material removal rate for each of the samples. The test was conducted on a workpiece of aluminum 6082 having dimensions of 12"×½" in a grinding application. METABO W12-125 QUICK grinder was used. Grinding was performed for up to 15 minutes per wheel using 10-12 amps. Samples S17 had an average cumulative G-Ratio of 2.776 g/g, cumulative WWR of 5.836 g/min, and cumulative material removal rate of 15.99 g/min. Samples C16 had an average cumulative G-Ratio of 2.686 g/g, cumulative WWR of 6.745 g/min, and cumulative material removal rate of 17.821 g/min. As illustrated in FIG. 10, Samples S17 and C16 demonstrated comparable performance.

Example 6

Abrasive samples, Samples C18 to C23 and S24 to S29 in the form of grinding wheels are formed to include about 38 vol % bond material of phenolic resin (28% of resole and 72% of novolac), about 52 vol % abrasive particles, and about 10 vol % porosity. The wheels have the dimensions of 5"×¼"×⅞". Sample C18 to C23 are made with a blend of brown fused alumina and Duramul EG abrasive particles, wherein the samples include Duramul EG abrasive particles in the content of 30 vol %, 40 vol %, 50 vol %, 60 vol %, 70 vol %, and 80 vol % for the total volume of the blend, respectively. Sample S24 to S29 are made with a blend of brown fused alumina and Molochite™ particles, wherein the samples include Molochite™ abrasive particles in the content of 30 vol %, 40 vol %, 50 vol %, 60 vol %, 70 vol %, and 80 vol % for the total volume of the blend, respectively. The wheel samples are tested on grinding a workpiece.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An abrasive article comprising:
a bonded abrasive body including:
abrasive particles contained within a bond material, wherein a first group of unagglomerated abrasive particles comprising a multiphase aluminosilicate, wherein the multiphase aluminosilicate comprises a first phase comprising a polycrystalline aluminosilicate and a second phase comprising an amorphous phase; and
an opening extending through the bonded abrasive body, the opening having dimensions suitable for mounting the bonded abrasive body on a system configured to actuate the bonded abrasive body for a material removal process.

2. The abrasive article of claim 1, wherein at least 20 vol % of the abrasive particles comprise the unagglomerated abrasive particles comprising the multiphase aluminosilicate for a total volume of the abrasive particles.

3. The abrasive article of claim 1, wherein the multiphase aluminosilicate comprises a mass content of alumina ($Al_2O_3$) and a mass content silica ($SiO_2$) relative to a total mass of the multiphase aluminosilicate, wherein a mass content ratio of silica ($SiO_2$) to alumina ($Al_2O_3$) is at least 1.

4. The abrasive article of claim 1, wherein the abrasive particles include a blend including the first group of unagglomerated abrasive particles comprising the multiphase aluminosilicate and a second group of abrasive particles comprising at least one material selected from the group consisting of oxides, carbides, nitrides, borides, diamond, or any combination thereof.

5. The abrasive article of claim 4, wherein the second group of abrasive particles include at least one material selected from the group consisting of silicon carbide, alumina, or a combination thereof.

6. The abrasive article of claim 5, wherein the abrasive particles include a blend including the first group of unagglomerated abrasive particles and the second group of abrasive particles comprising alumina, wherein the blend comprises at least 20 vol % and not greater than 80 vol % of the second group.

7. The abrasive claim of 6, wherein the second group of abrasive particles comprises unagglomerated particles comprising brown fused alumina.

8. The abrasive article of claim 4, wherein the blend includes at least 30 vol % and not greater than 80 vol % of the second group of abrasive particles.

9. The abrasive article of claim 1, wherein the multiphase aluminosilicate comprises at least 5 mass % and not greater than 99 mass % of the first phase for a total mass of the multiphase aluminosilicate.

10. The abrasive article of claim 1, further comprising a content ratio (Cr=C1/C2) of at least 0.1 and not greater than 3.5, wherein C1 is the mass percent of the first phase in the multiphase aluminosilicate and C2 is the mass percent of the second phase in the multiphase aluminosilicate.

11. The abrasive article of claim 1, wherein the second phase comprises an amorphous phase including silica.

12. The abrasive article of claim 1, wherein the multiphase aluminosilicate comprises not greater than 65 mass % alumina ($Al_2O_3$) for a total mass of the multiphase aluminosilicate, at least 30 mass % of silica ($SiO_2$) for a total mass of the multiphase aluminosilicate, or a combination thereof.

13. The abrasive article of claim 1, wherein the multiphase aluminosilicate comprises a Vicker hardness within a range of at least 6.5 GPa to not greater than 12 GPa, a density within a range of at least 2.5 g/cm³ to not greater than 2.8 g/cm³, or a combination thereof.

14. The abrasive article of claim 1, wherein the abrasive article comprises a cumulative G-ratio of at least 1.5 g/g, a cumulative material removal rate of at least 3 g/min, or a combination thereof.

15. The abrasive article of claim 1, wherein the bonded abrasive body comprises at least about 6 vol % and not greater than 50 vol % bond material for a total volume of the bonded abrasive body, at least 30 vol % and not greater than 85 vol % of abrasive particles for the total volume of the bonded abrasive body, and at least 8 vol % and not greater than 50 vol % porosity for the total volume of the bonded abrasive body.

16. The abrasive article of claim 1, wherein the multiphase aluminosilicate comprises not greater than 65 mass % alumina ($Al_2O_3$) for a total mass of the multiphase aluminosilicate, at least 30 mass % of silica ($SiO_2$) for a total mass of the multiphase aluminosilicate, and a mass content ratio of silica ($SiO_2$) to alumina ($Al_2O_3$) greater than 1.

17. The abrasive article of claim 1, wherein the multiphase aluminosilicate comprises at least 30 mass % and not greater than 60 mass % of silica ($SiO_2$) and least 30 mass % and not greater than 60 mass % of alumina ($Al_2O_3$) for a total mass of the multiphase aluminosilicate.

18. The abrasive article of claim 1, wherein the bonded abrasive body comprises an aspect ratio AR=D:t of at least 10:1 and not greater than 1000:1, wherein "D" is the diameter and "t" is the thickness.

19. The abrasive article of claim 1, wherein the bonded abrasive body comprises a first layer, a second layer, and a reinforcing layer disposed between a first abrasive layer and a second abrasive layer.

20. The abrasive article of claim 1, wherein the multiphase aluminosilicate has a Mohs hardness of no greater than 9.

21. The abrasive article of claim 1, wherein a majority of the abrasive particles are surrounded by the bond material, and the bond material defines a three-dimensional network extending throughout the bonded abrasive body.

22. The abrasive article of claim 1, wherein the first group of unagglomerated particles consist essentially of multiphase aluminosilicate.

* * * * *